(12) United States Patent
Honma et al.

(10) Patent No.: US 6,462,504 B2
(45) Date of Patent: Oct. 8, 2002

(54) ENERGIZATION CONTROL DEVICE FOR ELECTRIC MOTORS

(75) Inventors: Chiaki Honma; Masanori Sugiyama; Daisuke Yamada; Shinichiroh Iwasaki; Kohki Ohara, all of Aichi-ken (JP)

(73) Assignee: Aisin Seiki Kabushiki Kaisha, Aichi-ken (JP)

( * ) Notice: Subject to any disclaimer, the term of this patent is extended or adjusted under 35 U.S.C. 154(b) by 15 days.

(21) Appl. No.: 09/819,611

(22) Filed: Mar. 29, 2001

Prior Publication Data
US 2002/0024316 A1 Feb. 28, 2002

(30) Foreign Application Priority Data

Mar. 29, 2000 (JP) .......................... 2000-091683
Jun. 29, 2000 (JP) .......................... 2000-196032

(51) Int. Cl.⁷ ................................ H02P 1/46
(52) U.S. Cl. .................. 318/701; 318/254; 318/138
(58) Field of Search ............... 318/138, 254, 318/701, 439

(56) References Cited

U.S. PATENT DOCUMENTS 4,027,213 A * 5/1977 De Vahroger ............... 318/138
5,589,752 A 12/1996 Iwasaki et al.
5,780,983 A * 7/1998 Shinkawa et al. ........... 318/254
5,883,485 A * 3/1999 Mehlhorn .................... 318/701

FOREIGN PATENT DOCUMENTS

JP         7-298669       11/1995
JP        11-346494       12/1999
JP      2000-116183        4/2000

* cited by examiner

Primary Examiner—Khanh Dang
(74) Attorney, Agent, or Firm—Sughrue Mion, PLLC

(57) ABSTRACT

An energization control device is provided to prevent rapid decrease of current which is flowing through each of phase coils of an electric motor. A time duration is divided into three stages which ranges from an initiation of the current supply to the phase coil to a termination of the current supply to the phase coil. At the first stage, the second stage, and the third stage, soft/hard chopping energization control, 0-volt energization, and duty chopping energization control, respectively, are made. Energizing the phase coil is made by way of a first switching element and a second switching element. At the first stage, depending on an actual current value being in excess of a target current value, either of or both of the first switching element and the second element are made OFF. At the second stage, while the second switching element is being made OFF, the second switching element is made ON. At third stage, while the second switching element is being made OFF, the first switching element is, at a duty cycle, made ON and OFF alternately in repetition.

5 Claims, 19 Drawing Sheets

1a: first phase coil
1b: second phase coil
1c: third phase coil
1d: angular position sensor
2: current sensor
3: current sensor
4: current sensor S20: upper drive signal S21: lower drive signal S22: drive mode indication S23: soft/hard energization range S24: soft/hard upper S25: soft/hard lower S26: 0-volt loop energization range S27: 0-volt loop upper S28: 0-volt loop lower S29: 3-stage energization range S30: 3-stage off upper S31: 3-stage off lower

ENERGIZATION CONTROL DEVICE FOR ELECTRIC MOTORS

BACKGROUND OF THE INVENTION

1. Field of the Invention

The present invention is directed to an energization control device for an electric motor such as a switched reluctance motor.

2. Related Art

In general, a switched reluctance motor (SR motor) includes a rotor from which a plurality of equally-pitched pole portions are outwardly extended in the radial direction and a stator from which a plurality of equally-pitched pole portions are inwardly extended in the radial direction. The rotor is formed of a plurality of stacked thin iron plates. The stator has a plurality of copper-made phase coils which are wound on the respective plurality of pole portions of the stator. In the SR motor, as is well known, each of the pole portions of the stator acts as an electromagnet and when each of the pole portions of the rotor is attracted by the electromagnetic force of the stator the rotor is brought into rotation. Thus, changing the energizing conditions of the respective phase coils in turn depending on the current angular position of the rotor makes it possible to rotate the rotor in a desired direction.

A conventional SR motor is disclosed in e.g. Japanese Patent Laid-open Print No. Hei.11(1999)-346494 and is made up of three phase coils arranged on a stator, one end of each of the phase coils being connected to one of high and low potential lines of a power supply by way of a first switching element, the other end of each of the phase coils being connected to the other of the high and low potential lines of the power supply by way of a second switching element, one end of the each of the phase coils being connected to the other of the high and low potential lines of the power supply by way of a first diode which allows current flow from the latter to the former, the other end of each of the phase coils being connected to one of the high and low potential lines of the power supply by way of a second diode which allows current flow from the former to the latter; angular position detection means for detecting an angular position of the rotor;

rotational speed detection means for detecting a rotational speed of the rotor;

actual current detection means for detecting an actual current which passes through each of the phase coils; and control means determining an energization-on angle, a first energization-off angle, and a target current value, for each of the phase coils, on the basis of the rotational speed of the rotor and a target torque which is calculated based on externally inputted information, the control means approximating the actual current value to the target current value in such manner that, while the rotor rotates from the energization-on angle to the first energization-off angle, making one of the first and second switching elements and the other ON and OFF concurrently and making both the first and second switching elements ON concurrently are alternated.

In this conventional SR motor, within an angular range, even if the rotor exceeds the energization-off angle, a condition exists wherein one of the first switching elements and the second switching elements is made ON and the other is made OFF concurrently. However, in this conventional SR motor, when the first switching element and the second switching element are made OFF concurrently, the current flowing through each of the phase coils drops drastically. Thus, the stator and the rotor which are mutually attracted due to phase coil energization is suddenly released, thereby generating noise.

In view of the foregoing circumstances, a needs exists for overcoming the aforementioned problem and providing an energization control device for electric motors in which noise reduction is effectively established.

SUMMARY OF THE INVENTION

A first aspect of the present invention is to provide an energization control device for an electric motor which satisfy the request noted above and comprises:

a plurality of phase coils arranged on a stator, one end of each of the phase coils being connected to one of high and low potential lines of a power supply by way of a first switching element, the other end of each of the phase coils being connected to the other of the high and low potential lines of the power supply by way of a second switching element, one end of the each of the phase coils being connected to the other of the high and low potential lines of the power supply by way of a first diode which allows current flow from the latter to the former, the other end of each of the phase coils being connected to one of the high and low potential lines of the power supply by way of a second diode which allows current flow from the former to the latter;

angular position detection means for detecting an angular position of the rotor;

rotational speed detection means for detecting a rotational speed of the rotor;

actual current detection means for detecting an actual current which passes through each of the phase coils; and control means determining an energization-on angle, a first energization-off angle, and a target current value, for each of the phase coils, on the basis of the rotational speed of the rotor and a target torque which is calculated based on external information inputted, the control means making one of the first and second switching elements ON-OFF and the other ON while the rotor rotates from the energization-on angle to the first energization-off angle, and approximating the actual current value to the target current value, the control means determining a second energization-off angle on the basis of the target torque and the rotational speed of the rotor for each of the phase coils, the control means making both the first and second switching elements OFF concurrently while the rotator rotates from the second energization-off angle to the energization-on angle, the control means making one of the first and second switching elements ON-OFF at an arbitrary duty ratio and making the other OFF while the rotor moves from the first energization-off angle to the second energization-off angle.

In accordance with the first aspect of the present invention, both the first switching element and the second switching element are made ON when the rotor reaches the first energization-on angle, and one of the first and second switching elements is made ON-OFF and the other is made ON until the rotor reaches the first energization-off angle for establishing soft/hard chopping in accordance with the actual current value exceeding the target current value. When the rotor reaches the first energization-off angle, despite whether or not the actual current value exceeds the target current value, the second switching element is made OFF. The first switching element is made ON-OFF at a duty ratio for duty chopping until the rotor reaches the second energization-off angle. When the rotor reaches the second energization-off angle, both the first switching element and the second switching element are made OFF.

A second aspect of the present invention is to provide an energization control device, as a limited version of the first aspect, wherein the control means determines an intermediate energization-off angle between the first energization-off angle and the second energization-off angle, holds a condition under which one of the first and second switching elements is made ON and the other is made OFF concurrently while the rotor rotates from the first energization-off angle to the intermediate energization-off angle, and makes one of the first and second switching elements ON-OFF at an arbitrary duty ratio and makes the other OFF while the rotor moves from the intermediate energization-off angle to the second energization-off angle.

In accordance with the second aspect of the present invention, both the first switching element and the second switching element are made ON when the rotor reaches the first energization-on angle, and one of the first and second switching elements is made ON-OFF and the other is made ON until the rotor reaches the first energization-off angle for establishing soft/hard chopping in accordance with the actual current value exceeding the target current value. When the rotor reaches the first energization-off angle, despite whether or not the actual current value exceeds the target current value, the second switching element is made ON while the first switching element is made OFF for doing 0-volt loop chopping and such a condition remains unchanged until the rotor reaches the intermediate energization-off angle. When the rotor reaches the intermediate energization-off angle, the second switching element is made OFF. The first switching element is made ON-OFF at a duty ratio for duty chopping until the rotor reaches the second energization-off angle. When the rotor reaches the second energization-off angle, both the first switching element and the second switching element are made OFF.

A third aspect of the present invention is to provide an energization control device, as a limited version of the second aspect, wherein the control means makes one of the first and second switching elements ON-OFF at the duty ratio which is changed such that a ratio of an ON-time duration to an OFF-time duration is reduced with passing of time and makes the other OFF while the rotor moves from either of the first energization-off angle or the intermediate energization-off angle to the second energization-off angle.

In accordance with the third aspect of the present invention, the second switching element is made OFF when the rotor reaches the first energization-off angle or the intermediate energization-off angle, and until the rotor reaches the second energization-off angle the first switching element is made ON-OFF for doing duty chopping at a duty ratio which varies such that the percentage of an ON-time duration decreases with passing of time relative to an OFF-time duration.

A fourth aspect of the present invention is to provide an energization control device as a limited version of third aspect wherein one of the first energization-off angle and the intermediate energization-off angle which are originally determined is put ahead.

A fifth aspect of the present invention is to provide an energization control device as a limited version of the forth aspect wherein between the first energization-off angle to the intermediate energization-off angle the target current value is increased.

BRIEF DESCRIPTION OF THE DRAWINGS

The above and other objects, features and advantages of the present invention will be more apparent and more readily appreciated from the following detailed description of preferred exemplary embodiments of the present invention, taken in connection with the accompanying drawings, in which.

DETAILED DESCRIPTION OF THE PRESENT INVENTION

Preferred embodiments of the present invention will be described hereinafter in detail with reference to the accompanying drawings.

Figure 1:
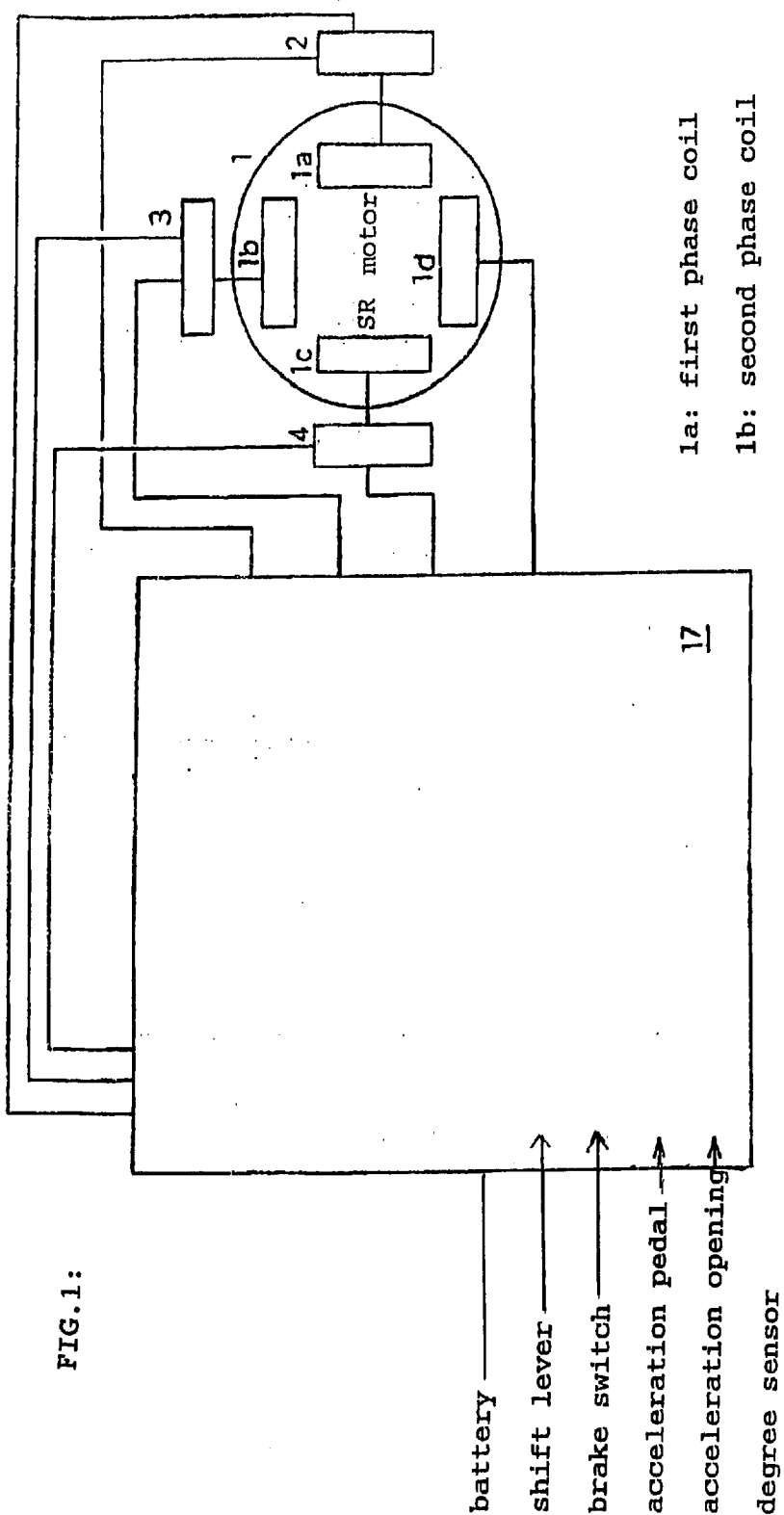
FIG. 1 illustrates a block diagram of an energization control device for an electric motor which is in the form of a three-phase switched reluctance motor.

First of all, with reference to FIG. 1, there is illustrated a block diagram of a principal or main portion of a driving unit of an electric powered automotive vehicle (EV). This principal portion includes a three-phase switched reluctance motor 1 which will be referred simply as the SR motor 1. The SR motor 1 is under control of a controller 17 to which signals are fed from a shift lever, a brake switch, an accelerator switch, an acceleration opening degree sensor, and others. On the basis of these signals, the controller 17 controls the SR motor 1. For driving the controller 17 and the SR motor 1, current is applied from an on-vehicle battery to each of the SR motor 1 and the controller 17.

Figure 2:
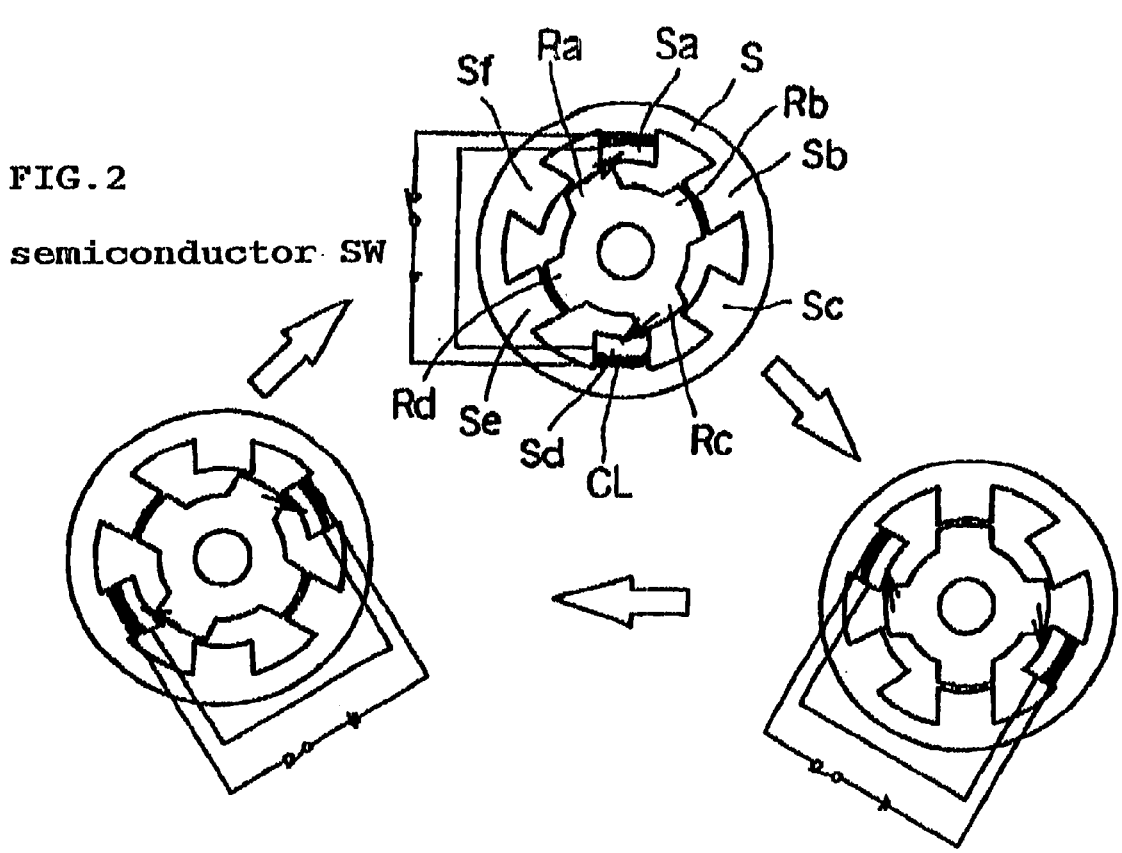
FIG. 2 illustrates the structural and operational concept of an SR structure.

Referring next to FIG. 2, there is illustrated a basic concept of the SR motor 1 and the driving principle of the SR motor 1 or how the SR motor 1 operates. The SR motor 1 includes a stator S in which a space is defined and a rotor R which is accommodated in the space of the stator S for free rotation. The rotor R is formed of a plurality of stacked thin iron plates. The rotor R is provided at its outer circumference with four integral radially-outwardly extended and equally spaced (i.e. 90 degree pitched) pole portions Ra, Rb, Rc, and Rd. Similarly, the stator S is formed of a plurality of stacked thin iron plates. The stator S is provided at its inner periphery with six equally spaced (i.e. 60 degree pitched) pole portions Sa, Sb, Sc, Sd, Se, and Sf. The pole portions Sa, Sb, Sc, Sd, Se, and Sf are wound with electric coils CL, respectively. It is to be noted for the simplicity in illustration only the electric coils CL wound on the respective poles Sa and Sd are illustrated.

At this stage, if a set of the electric coils wound on the respective poles Sa and Sd, a set of the electric coils wound on the respective poles Sb and Se, and a set of the electric coils wound on the respective poles Sc and Sf are defined as a first phase coil 1a, a second phase coil 1b, and a third phase coil 1c, respectively, as indicated in FIG. 2, energizing the first phase coil 1a, the third phase coil 1c, and the second phase coil 1b individually and cyclically in such an order makes it possible to continually rotate the rotor R in the clockwise direction. That is, due to the fact that two energized poles of the stator S constitute an electric magnet, two of the respective nearest poles of the rotor R are attracted to the electric magnet, thereby rotating the rotor R. For making such a rotation continuous, switching the energization has to be made as the rotor R rotates. Actually, in the SR motor 1, whenever the rotor R rotates through an angle of 30 degrees, the first phase coil 1a, the third phase coil 1c, and the second phase coil 1b have to be energized cyclically in this order.

Referring back to FIG. 1, the SR motor 1 includes the first phase coil 1a, the second phase coil 1b, and the third phase coil 1c which are essential elements for driving the SR motor 1 and an angular position sensor 1d which detects a current angular position of the rotor R to issue a rotation angle signal S33. The phase coils 1a, 1b, and 1c are coupled to drivers (not shown) of the controller 17 by way of signal lines, respectively. Current sensors 2, 3, and 4 are provided in the respective signal lines. The current sensors 2, 3, and 4 issue a current signal S6. The current signal S6 is indicative of a voltage which is in proportion to currents actually flowing through the respective phase coils 1a, 1b, and 1c.

The controller 17 is made up of a microcomputer, an input interface, a memory for map storage, a power supply circuit, a current waveform shaping circuit, a comparison circuit, a driving control management circuit, and the driver. The controller 17 calculates the rotational speed (i.e. rotation number) of the rotor R on the basis of the angular position of the rotor R which is detected by the angular position sensor 1d. In addition, the controller 17 successively calculates a target torque of the SR motor 1 on the basis of the inputted information fed from each of the shift lever, the brake switch, the acceleration switch, and the acceleration opening degree sensor. Using the target torque and the rotational speed of the SR motor 1, the controller 17 controls the currents flowing through the respective phase coils 1a, 1b, and 1c.

Figure 3:
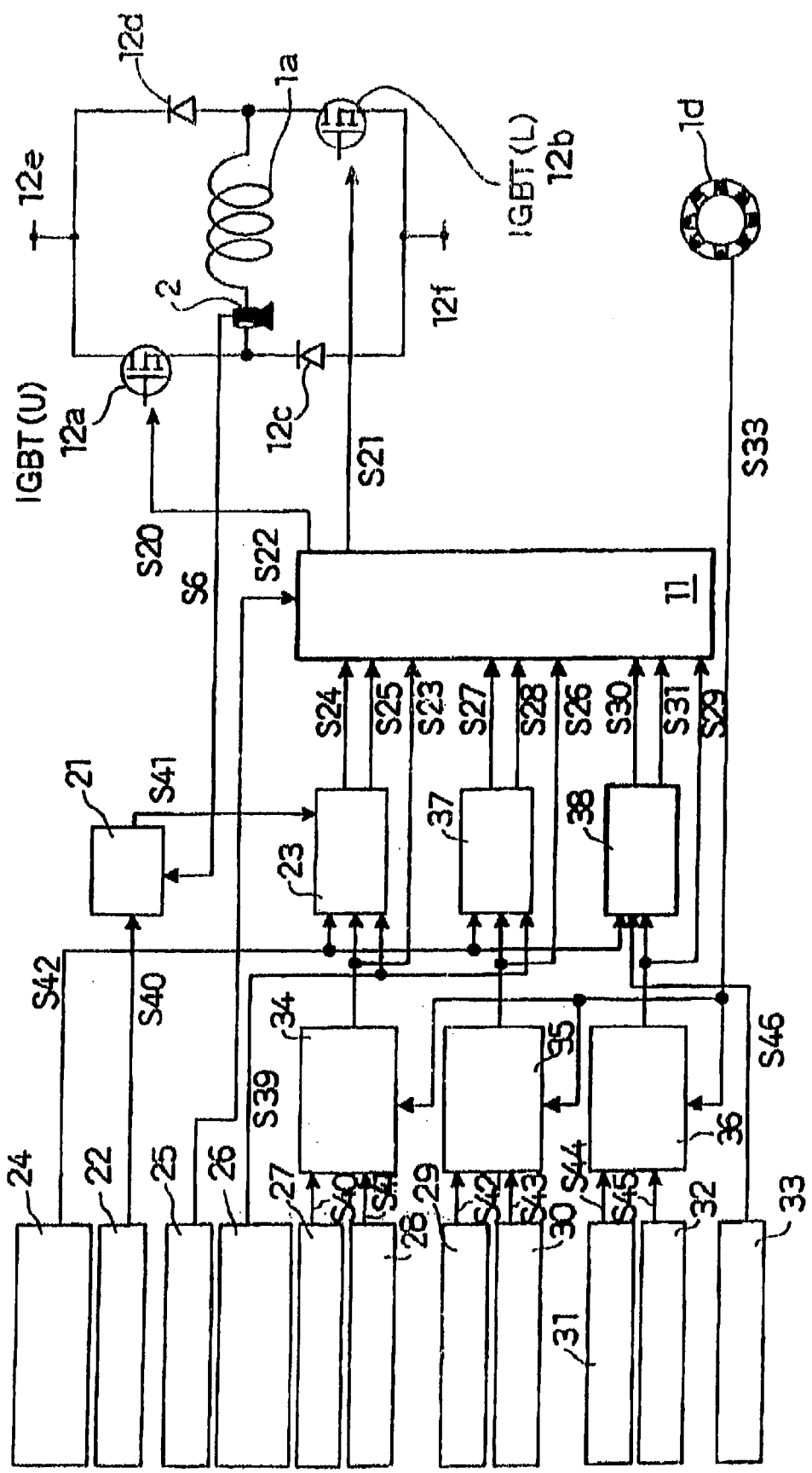
FIG. 3 illustrates a block diagram of a driver which is an important element of the energization controller 17 which is depicted in FIG. 1.

Referring now to FIG. 3, there is illustrated a block diagram of one of the drivers of the controller 17 which is designed for controlling the energization of the first phase coil 1a of the SR motor 1. The drivers for controlling the energization of each of the second phase coil 1b and the third phase coil 1c is similarly constructed. One end of the first phase coil 1a is connected to a higher potential line 12e of a DC power source (not shown) by way of an upper side switching transistor 12a (i.e. a first switching element: IGBT(U)), while the other end of the first phase coil 1a is connected to a lower potential line 12f of the DC power source by way of a lower side switching transistor 12b (i.e. a second switching element: IGBT(L)). In addition, a diode 12c is connected between one end of the first phase coil 1a and the lower potential line 12f which permits current flow only from the latter to the former, while a diode 12d is connected between the other end of the first phase coil 1a and the higher potential line 12e which permits current flow only from the former to the latter. Thus, when both of the transistors 12a and 12b are made ON concurrently, a current supply can be established from the power source to the first phase coil 1a. On the other hand, at least one of the transistors 12a and 12b is made OFF (i.e. either the transistor 12a or the transistor 12b is made OFF or both the transistor 12a and the transistor 12b are made OFF), the current supply from the power source to the first phase coil 1a can be interrupted.

Figure 4:
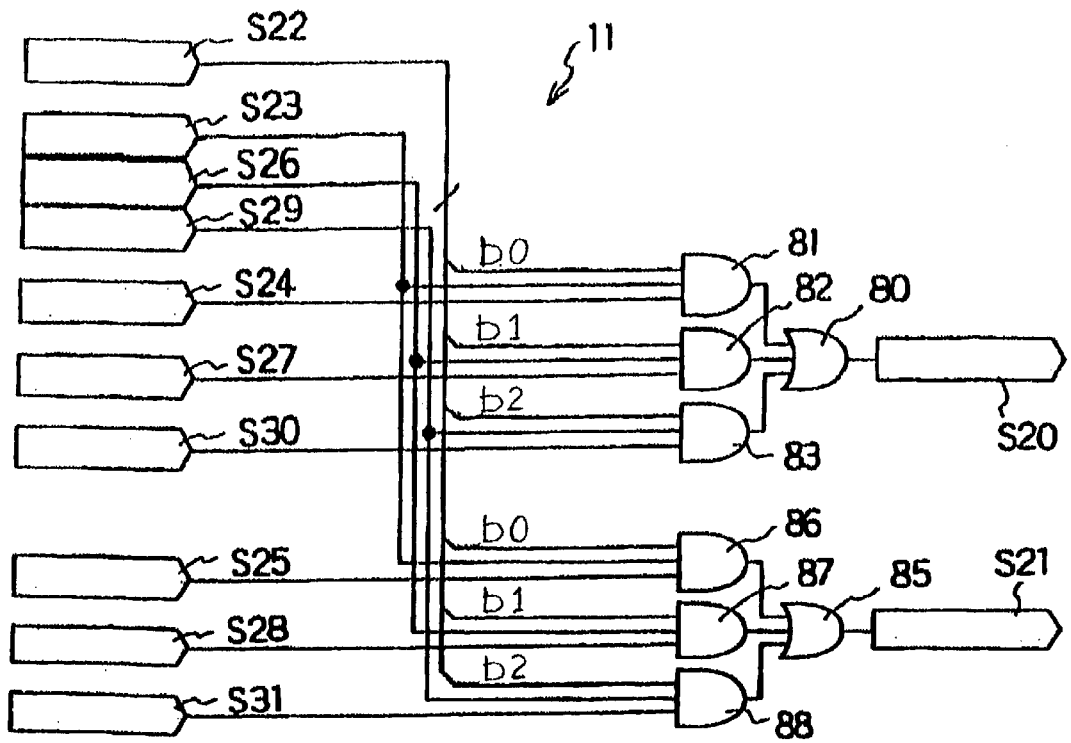
FIG. 4 illustrates a block diagram of a drive control management circuit 11 of the driver which is depicted in FIG. 3.

The driver includes the driving control management circuit 11 which issues an upper driving signal S20 and a lower driving signal S21 for driving the upper side switching transistor 12a and the lower side switching transistor 12b, respectively. The driving control management circuit 11, as illustrated in FIG. 4 in detail, includes an OR-gate 80 from which the upper driving signal S20 is outputted, three AND-gates 81, 82, and 83 which issue signals, respectively, to the OR-gate 80, an OR-gate 85 from which the lower driving signal S21 is outputted, and three AND-gates 86, 87, and 88 which issue signals, respectively, to the OR-gate 85. Each of the AND-gates 81, 82, 83, 86, 87, and 88 has three input terminals one of which (i.e. a first input terminal) is to be inputted with a driving mode indication signal S22. The driving mode indication signal S22 includes a 3-bit soft/hard chopping indication signal b0, a 0-volt loop chopping indication signal b1, and a duty chopping indication signal b2. The AND-gates 81 and 86 are designed to drive the first phase coil 1a on the basis of soft/hard chopping. A second input terminal of each of the AND-gates 81 and 86 is to be inputted with a soft/hard chopping energization range signal S23. A third input terminal of the AND-gate 81 is to be inputted with a soft/hard chopping upper driving signal S24 from a soft/hard chopping driving circuit 23 as will be detailed later. A third input terminal of the AND-gate 86 is to be inputted with a soft/hard chopping lower driving signal S25. AND-gates 82 and 87 are designed to drive the first phase coil 1a on the basis of 0-volt loop chopping. A second terminal of each of the AND-gates 82 and 87 is to be inputted with a 0-volt loop chopping energization range signal S26. A third input terminal of the AND-gate 82 is to be inputted with a 0-volt loop chopping upper driving signal S27 from a 0-volt loop chopping driving circuit 37 as will be detailed later. A third input terminal of the AND-gate 87 is to be inputted with a 0-volt chopping lower driving signal S28. The AND-gates 83 and 88 are designed to drive the first phase coil 1a on the basis of duty chopping. A third input terminal of each of the AND-gates 83 and 88 is to be inputted with a duty chopping energization range signal S29. A third input terminal of the AND-gate 83 is to be inputted with a duty chopping upper driving signal S30 from a duty chopping driving circuit 38 as will be detailed later. A third input terminal of the AND-gate 88 is to be inputted with a duty chopping lower driving signal S31. The foregoing signals are in the form a two-value signal which takes a HIGH or LOW level (ON or OFF state).

Referring back to FIG. 3, the driver includes, in addition to the driving control management circuit 11, a comparator 21, a chopping clock signal generation means 24, an indication current generation means 22, a driving mode instruction signal generation means 25, a soft/hard chopping mode instruction signal generation means 26, a first energization on-angle signal generation means 27, a first energization off-angle signal generation means 28, an intermediate energization on-angle signal generation means 29, an intermediate energization off-angle signal generation means 30, a second energization on-angle signal generation means 31, a second energization off-angle signal generation means 32, an on-time set value signal generation means 33, a soft/hard chopping energization timing judgment circuit 34, a 0-volt loop chopping energization timing judgment circuit 36, a 0-volt loop chopping drive circuit 37, and a duty chopping drive circuit 38.

The comparator 21 compares an indication current signal S40 which is outputted from the indication current generation means 22 and a signal S6 which depends on the current detected at the current sensor 2. The result is outputted, as a two-value signal S41, to the soft/hard chopping drive circuit 23. The chopping clock signal generation means 24 produces and outputs a chopping clock signal of 15 kHz to the soft/hard chopping drive circuit 23, the 0-volt loop chopping drive circuit 37, and the duty chopping drive circuit 38. The drive mode instruction signal generation means 25 outputs the aforementioned drive mode instruction signal S22 to the drive control management circuit 11. The soft/hard chopping mode instruction signal generation means 26 outputs a soft/hard chopping mode instruction signal S39 to the soft/hard chopping drive circuit 23 and the 0-volt loop chopping drive circuit 37. The first energization on-angle signal generation means 27 and the first energization off-angle signal generation means 28 output a first energization on-angle zz signal S40 and a first energization off-angle signal S41, respectively, to the soft/hard chopping energization timing judge circuit 34 to which a rotation angle signal S33 is inputted from the angular position sensor 1d. On the basis of the inputted signals as mentioned above, the soft/hard chopping energization timing judge circuit 34 outputs the soft/hard chopping energization range signal S23 to the drive control management circuit 11 and the soft/hard chopping drive circuit 23. The intermediate energization on-angle signal generation means 29 and the intermediate energization off-angle signal generation means 30 output an intermediate energization on-angle signal S42 and an intermediate energization off-angle signal S43, respectively, to the 0-volt loop chopping energization timing judge circuit 35 to which the rotation angle signal S33 is also fed. On the basis of the aforementioned signals, the 0-volt loop chopping energization timing judge circuit 35 outputs a 0-volt loop chopping energization range signal S26 to the drive control management circuit 11 and the 0-volt loop chopping drive circuit 37. The second energization on-angle signal generation means 31 and the second energization on-angle signal generation means 32 output a second energization on-angle signal S44 and a second energization on-angle signal S45, respectively, to the duty chopping energization timing judge circuit 36 to which the rotational angle signal S33 is fed. On the basis of the aforementioned signals, the duty chopping energization timing judge circuit 36 outputs a duty chopping energization range signal S29 to the drive control management circuit 11 and the duty chopping drive circuit 38. The on-time set value signal generation means 33 outputs an on-time set value signal S46 to the duty chopping drive circuit 38. It is to be noted that the aforementioned circuits 34, 23, 35, and 37 are described in detail in Japanese Patent laid-open print No. Hei.11 (1999)-346494.

A detailed explanation will be made with respect to the duty chopping energization timing judge circuit 36. The second energization on-angle signal S44 and the second energization off-angle signal S45 correspond to an angle at which the duty chopping is initiated and an angle at which the duty chopping is terminated, respectively. The second energization on-angle signal S44 and the second energization off-angle signal S45 are compared to the rotational angle signal S33 to determine an energization initiation angular position and an energization termination angular position, respectively. That is, when the angular position of the rotor R is between the energization initiation angular position and the energization termination angular position, the duty chopping energization range signal S29 is made HIGH level (i.e. ON state) to output, while when the angular position of the rotor R is between the energization termination angular position and the energization initiation angular position, the duty chopping energization range signal S29 is made LOW level (i.e. OFF state) to output.

Figure 5:
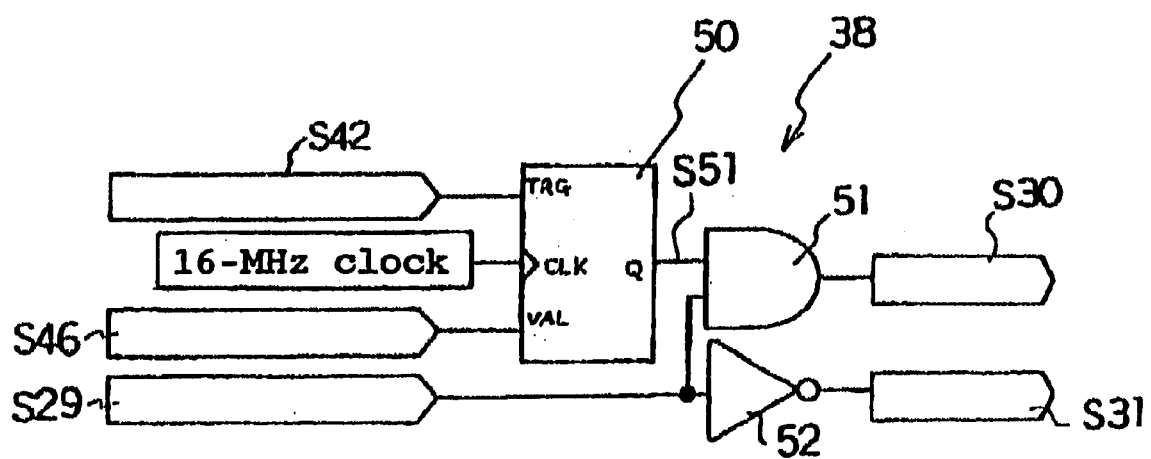
FIG. 5 illustrates a block diagram of a duty chopping drive circuit 38 of the driver which is depicted in FIG. 3.

As illustrated in FIG. 5, the duty chopping drive circuit 38 includes a counter 50, an AND-gate 51 and an inverter 52. The counter 50 has a TRG terminal, a CLK terminal and a VAL terminal to which the aforementioned signal S70, a clock signal of 16 kHz, and the aforementioned signal s46 are fed or inputted, respectively. The counter 50 has a Q-terminal from which an output signal S51 is outputted to one of input terminals of the AND-gate 51. The other input terminal of the AND-gate 51 is inputted with the aforementioned signal S29. The AND-gate 51 outputs a signal S30. The signal S29 is inverted at the inverter 52, thereby outputting therefrom an inverted signal S31.

Figure 6:
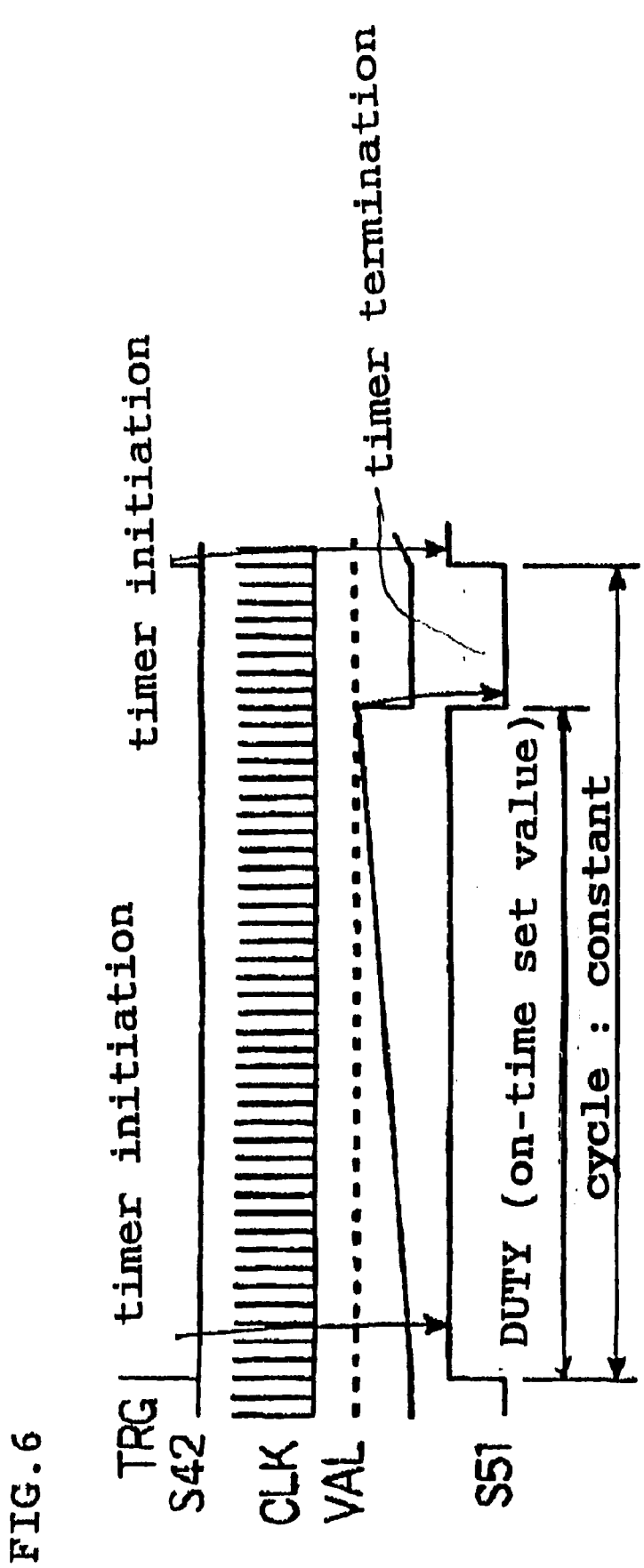
FIG. 6 illustrates a time-chart which is indicative of an operation condition of the drive circuit 38 which is shown in FIG. 5.

As shown in FIG. 6, in the duty chopping drive circuit 38, a chopping clock signal S70 is expected to trigger a timer and simultaneously the signal S51 outputted from the Q-terminal of the flip-flop 50 is made to be HIGH level from LOW level. Counting the timer is executed in synchronization with the 16 MHz clock signal fed to the CLK terminal of the flip-flop 50. The timer is expected to stop immediately when the counted value becomes equal to the value which is indicated in the on-time set value signal fed to the VAL terminal of the flip-flop 50. Then, after changing the output signal S51 of the Q-terminal from HIGH level to LOW level, the time is ready for waiting the next trigger. Thus, while the signal S29 is at HIGH level, the signal S30 becomes HIGH level and LOW level if the signal S51 is at HIGH level and LOW level, respectively. That is, while a time duration which depends on the signal S70, the on-time set value signal S46 determines a ratio between HIGH-level time duration of the Signal S30 and Low-level time duration of the signal S30. The on-time set value signal S46 can indicate a value, at will or discretionary, a fixed value or a variable value as will be detailed later, independent of the driving condition of the SR motor 1. In the present embodiment, immediately upon initiation of the timer, the signal S51 which is outputted from the Q-terminal is changed from LOW level to HIGH level. For changing the level of the signal S51 from LOW to HIGH, providing a circuit such as an inverter is available. In addition, a design can be employed wherein when the timer indication becomes the set value by the signal S46 the level of the signal S51 is changed from LOW to HIGH.

Figure 7:
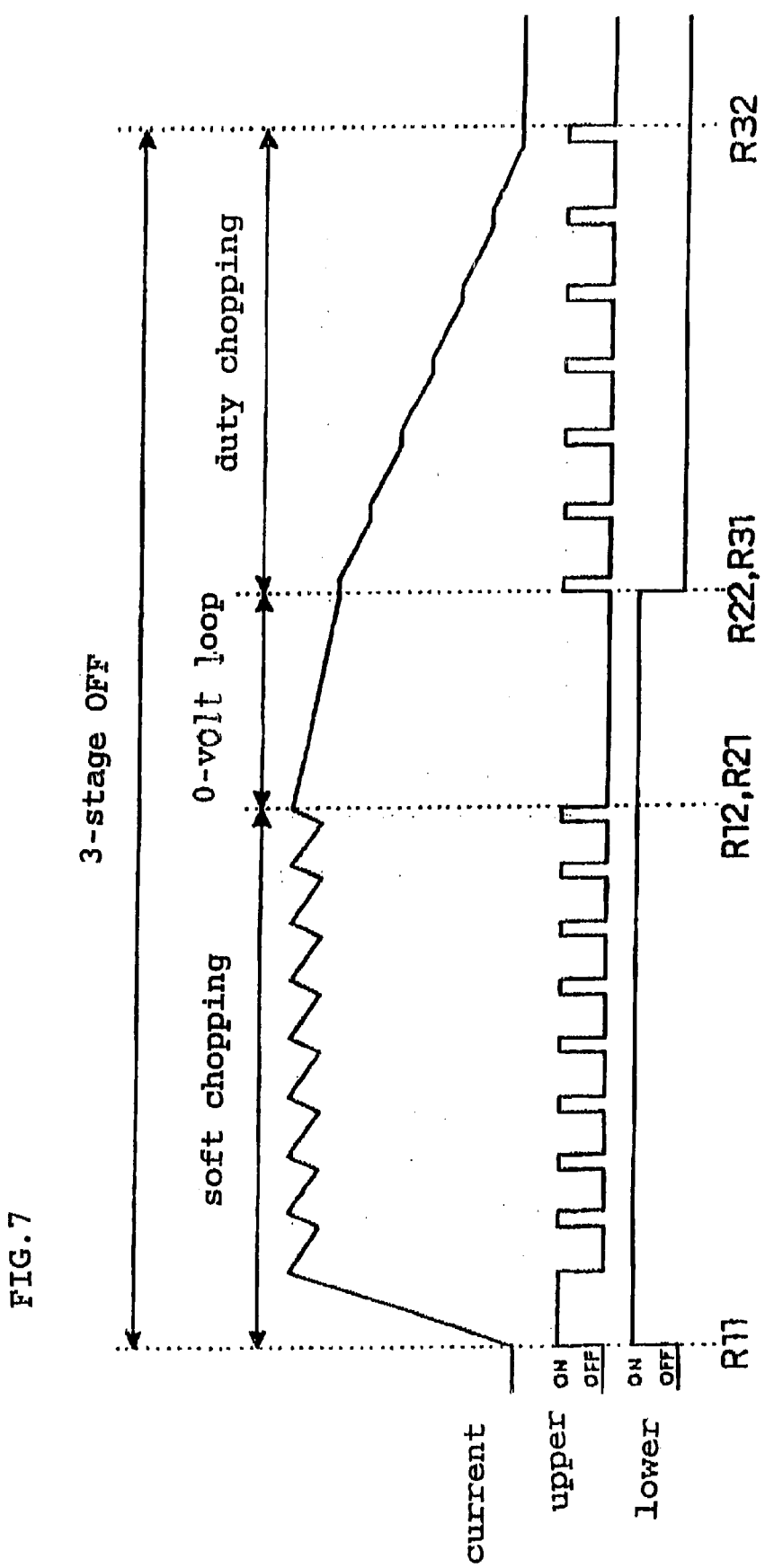
FIG. 7 illustrates a time-chart which is indicative of current flow through each of the phase coils depicted in FIG. 1.

The controller 17 having the aforementioned function determines, on the basis of the target torque and the rotational speed of the SR motor 1, for each of the phase coils 1a, 1b, and 1c, a first energization-on angle R11, a first energization-off angle R12, an intermediate energization-on angle R21, an intermediate energization-off angle R22, a second energization-on angle R31, a second energization-off angle R32, and a target current value relative to the rotational speed. These angles R11, R12, R21, R22, R31, and R32 correspond to the signals S40, S41, S42, S43, S44, and S45, respectively. The first intermediate energization-on angle R21 and the second energization-on angle R31 are in coincidence with the first energization-off angle R12 and the intermediate energization-off angle R22, respectively. As shown in FIG. 7, when the rotational angle becomes the first energization-on angle R11, both the upper side switching element 12a and the lower side switching element 12b are closed or made ON. Before the rotation angle reaches the first energization-off angle R12 at which soft/hard chopping is initiated, either or both of the upper side switching element 12a and the lower side switching element 12b is opened or made OFF, depending on whether the real current exceeds the target current. When the rotation angle becomes the first energization-off angle R12 (i.e. the intermediate energization-on angle R21), regardless of whether or not the real current is larger than the target current, the lower side switching element 12b is made ON while the upper side switching element 12a is made OFF (instead it is possible that the upper side switching element 12a is made ON while the lower side switching element 12b is made OFF) for doing 0-volt loop chopping. The resulting condition is held until the rotation angle becomes the intermediate energization-off angle R22. When the rotation angle reaches the intermediate energization-off angle R2, for doing duty chopping, the lower side switching element 12b is made OFF and the upper side switching element 12a is made ON and OFF alternately, depending on duty ratio, until the rotation angle reaches the second energization-off angle R33. Instead, it is possible that the upper side switching element 12a is made OFF and the lower side switching element 12b is made ON and OFF alternately, depending on duty ratio, until the rotation angle reaches the second energization-off angle R33. In the drawing, the alternation of ON and OFF states of the upper side switching element 12a is initiated when the element 12a is in ON state. However, the alternation of ON and OFF states of the upper side switching element 12a can be initiated when the element 12a is in OFF state. When the rotation angle reaches the second energization-off angle R32, both the upper side switching element 12a and the lower side switching element 12b are made OFF.

Figure 21:
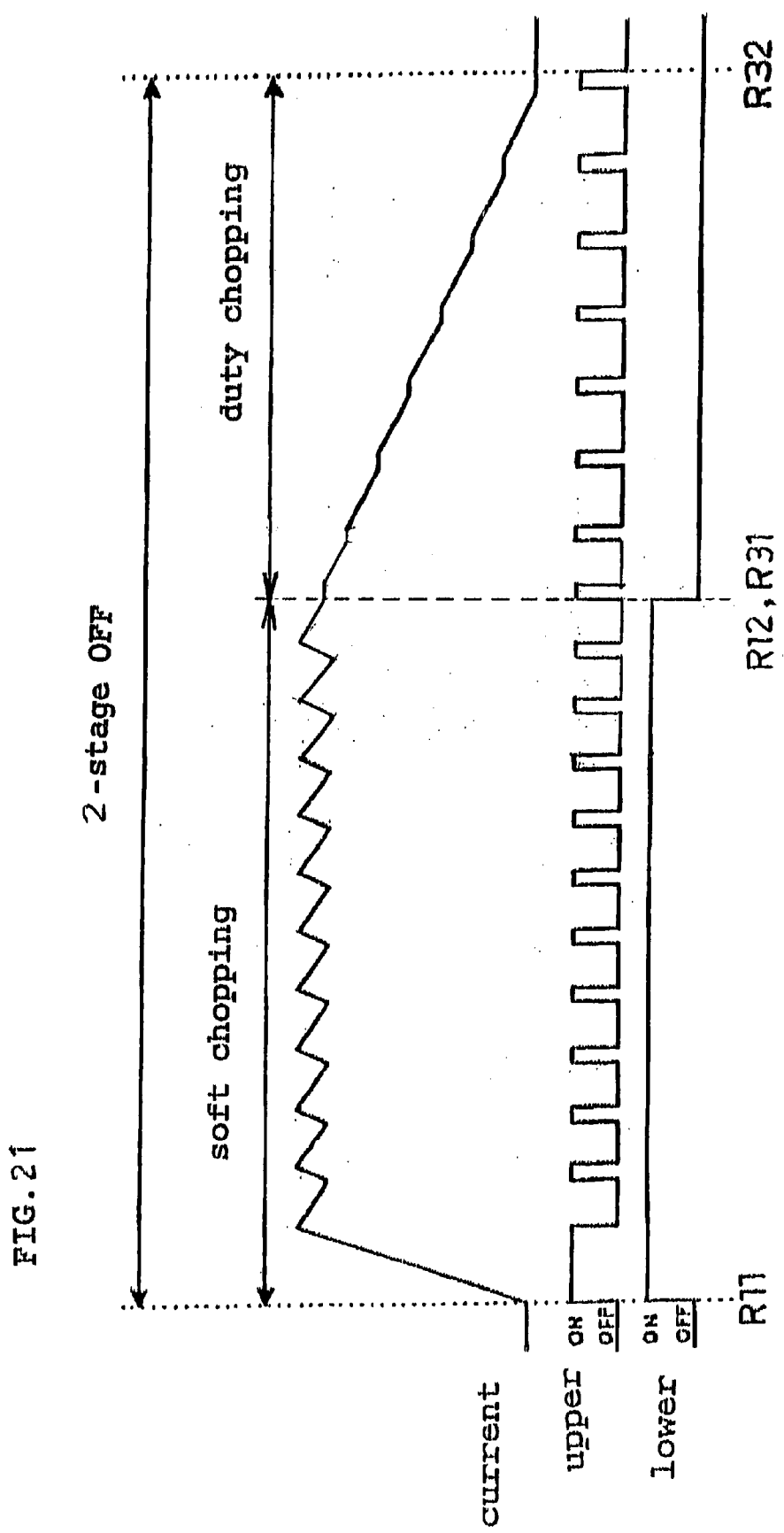
FIG. 21 illustrates a time-chart which is indicative of current flow through each of the phase coils in a first embodiment.

Instead of the aforementioned three stage energization of the first phase coil 1a which is made up of hard/soft chopping energization, 0-volt loop chopping energization, and duty chopping energization, two stage energization shown in FIG. 21 can be employed which is made up of hard/soft chopping and duty chopping depending on the driving condition and environment of the SR motor 1. In this two stage energization, the controller 17 fails to output the intermediate energization-on angle, which results in the first energization-off angle becoming in coincidence with the second energization-on angle.

[Other embodiments]

Figure 8:
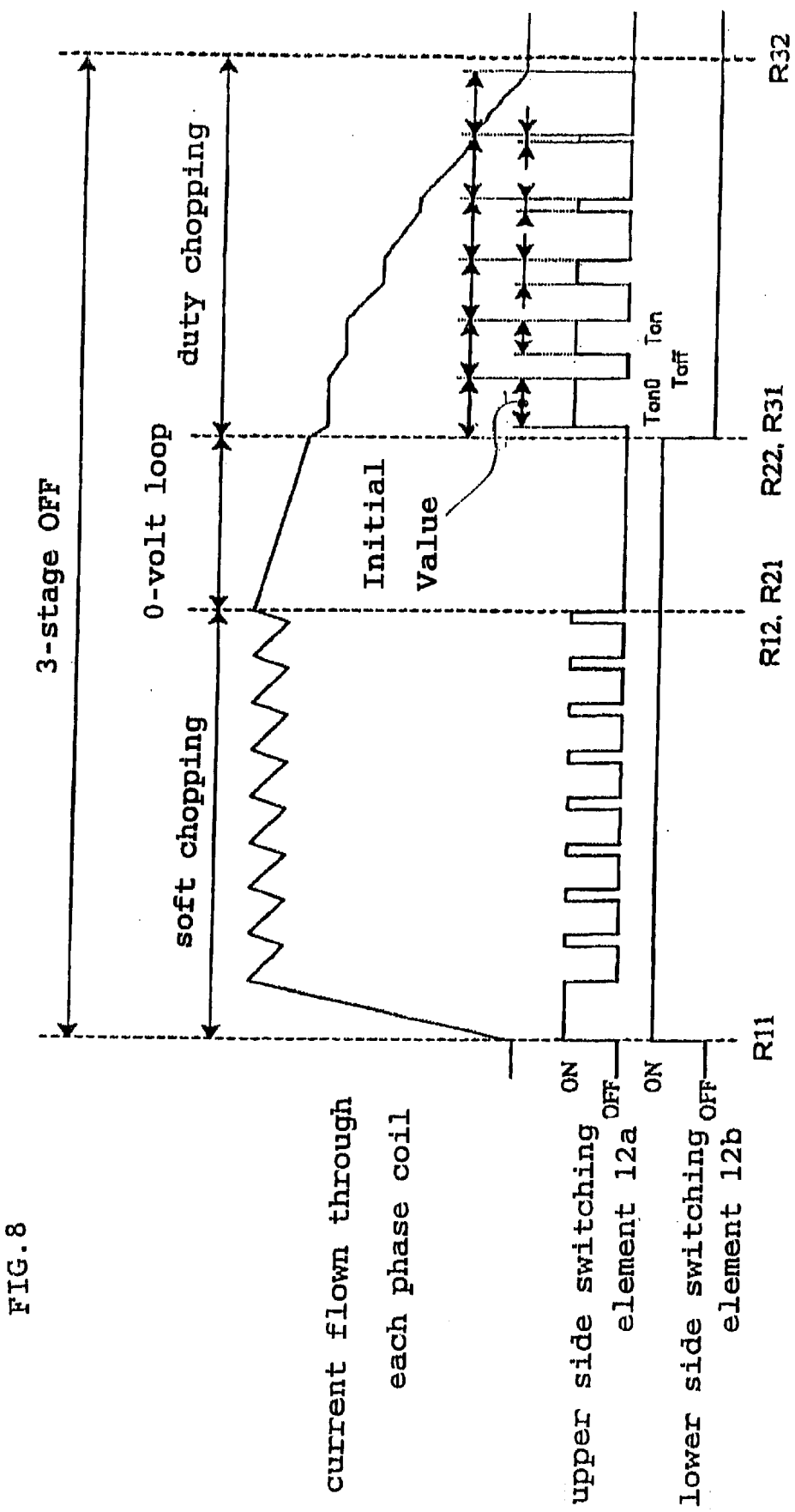
FIG. 8 illustrates a time-chart which is indicative of current flow through each of the phase coils in a second embodiment.
Figure 9:
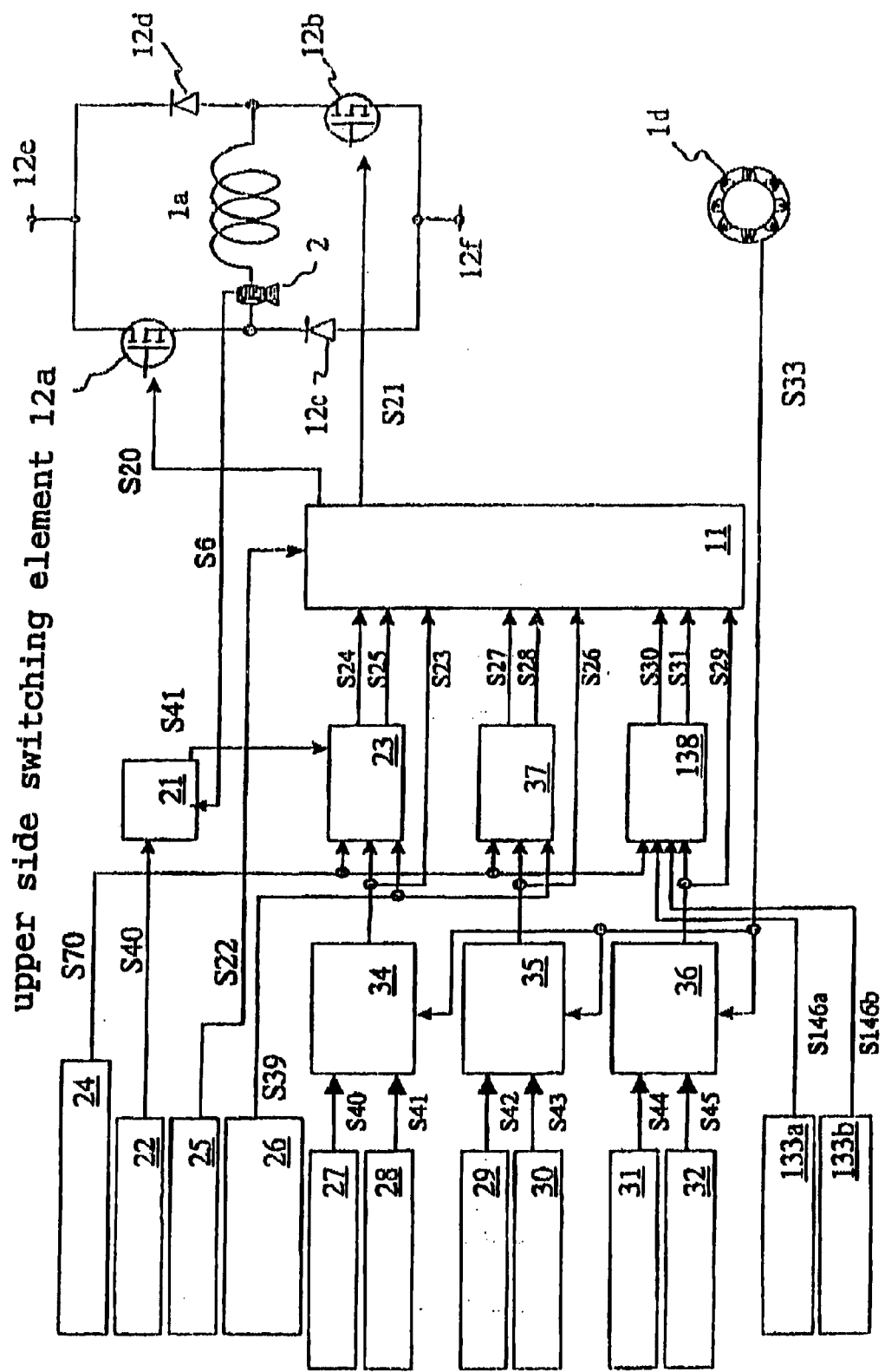
FIG. 9 illustrates a block diagram of a driver which is an important element of the energization controller 17 in the second embodiment which is depicted in FIG. 1.

In the aforementioned embodiment, during duty chopping, either of the upper side switching element 12a and the lower side switching element 12b is made ON and OFF alternately depending on a duty ratio of fixed value. As will be detailed hereinafter, the duty ratio can be made variable. As shown in FIG. 8, as the time passes from the second energization-on angle R31 to the second energization-off angle R32, a ratio of on-time-duration to off-time-duration per unit time duration in the upper side switching element 12a changes such that the on-time-duration decreases gradually. This control can be made by replacing the upper side switching element 12a with the lower side switching element 12b. As can be understood from the depiction in FIG. 8, the current value decreases in gradual stepwise fashion (not drastically), which makes it possible to decrease the noise of the SR motor 1 in motion.

Figure 10:
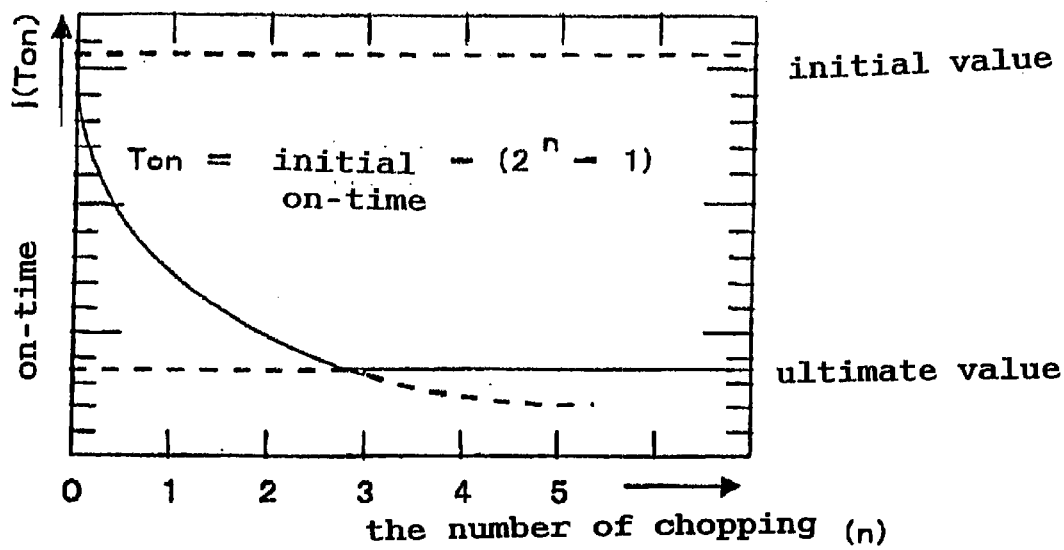
FIG. 10 illustrates a graph which is indicative of the number of chopping vs. duty-on time in the second embodiment.
Figure 11:
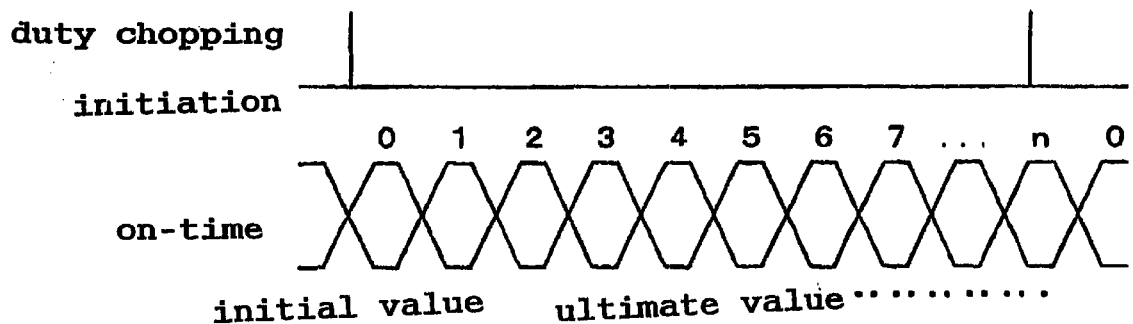
FIG. 11 illustrates a graph which is indicative of how the duty-on time changes with passing of time.

As to how to decrease the on-time-duration to the off-timeduration per unit time duration, two methods can be proposed. One is to decrease the on-time-duration as the time passes, while the other is to calculate using the formula: on-time-duration Ton=initial on-time-duration Ton0−(2.sup.n−1) where n is a counting number which is indicative of repeat number of chopping n is set to be zero when initial chopping, the initial on-time-duration is an initial value of on-time-duration. According to the latter or second method, when the initial on-time-duration Ton0 is assumed to be 10 microseconds, the first chopping on-time duration becomes 9 microseconds (10−(2.sup.1−1)), the second chopping on-time duration becomes 7 microseconds (10−(2.sup.2−1)). Each case does not make the on-time-duration smaller and smaller to infinity but sets a minimum on-time-duration as an ultimate value. As indicated in FIGS. 10 and 11, a minimum on-time-duration (i.e. the ultimate value) is set through the second method, after on-time-duration per unit time duration reaches the minimum on-time-duration, the minimum on-time-duration is used as it is until the rotation angle reaches the second energization-off angle RRR32. It is to be noted that the initial on-time-duration and the ultimate value varies as shown in FIG. 11 depending on the rotational number and the target output torque of the SR motor 1.

Figure 12:
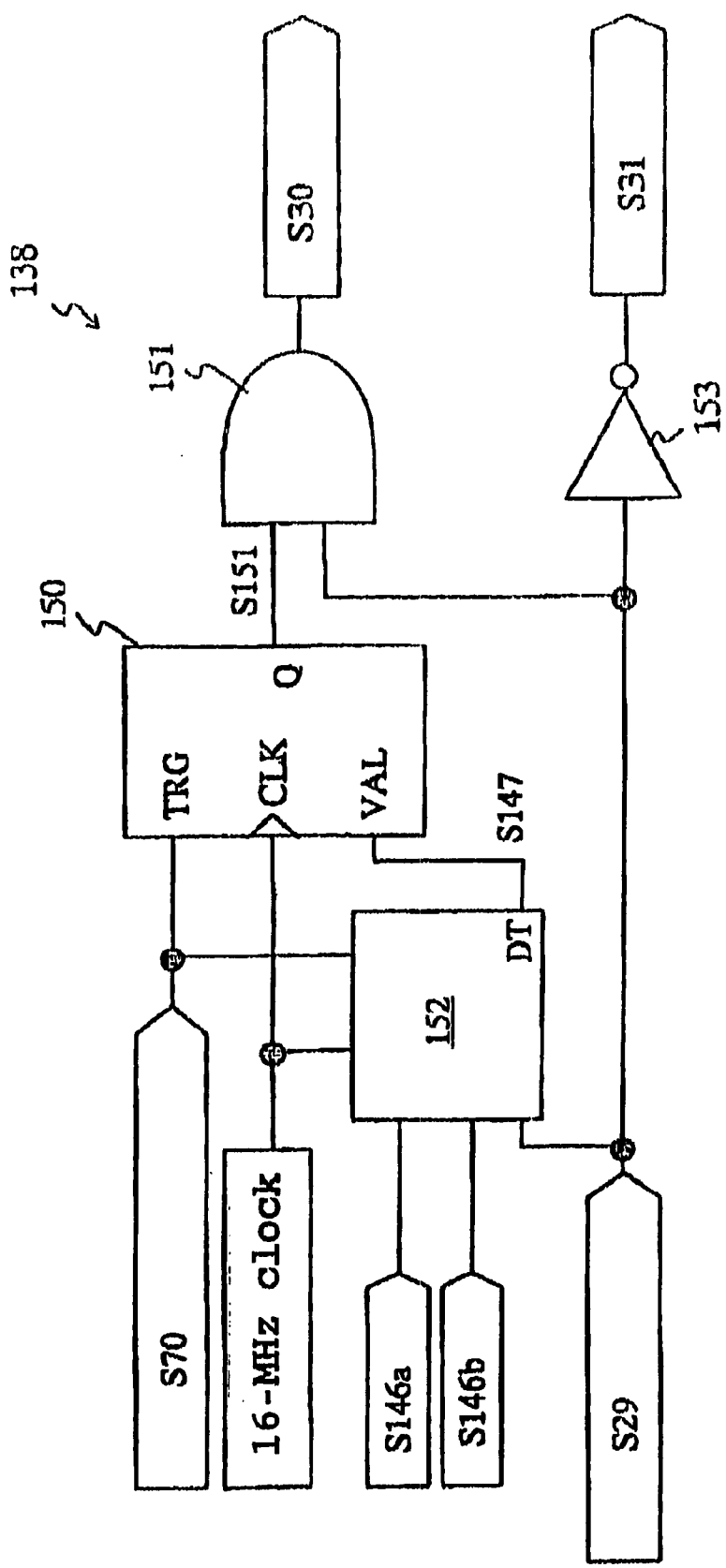
FIG. 12 illustrates a block diagram of a duty chopping drive circuit 38 of the driver which is depicted in FIG. 9.

Referring to FIG. 12, there is illustrated a block diagram of a driver of the controller 17 which is designed for controlling the energization of the first phase coil 1a of the SR motor 1. Similar drivers are used for controlling the energization of each of the second phase coil 1b and the third phase coil 1c of the SR motor 1. Portions of this driver which are common to those of the driver shown in FIG. 3 are designated with same reference numerals for not being explained. A duty chopping drive circuit 138 includes a counter 150, an AND-gate 151, and a duty step circuit 152. The duty step circuit 152 is inputted with an initial on-time-duration signal S146a and an ultimate on-time-duration signal S146b which are issued from an initial on-time-duration signal generation means 133a and an ultimate on-time-duration signal generation means 133b, respectively. The counter 150 has a TRG-terminal, a CLK-terminal CLK, a VAL-terminal, and a Q-terminal. The TRG-terminal, the CLK-terminal, and the VAL-terminal are inputted with the chopping clock signal S70, the 16 MHz clock signal, and an output signal S147 of a duty step circuit 152, respectively. An output signal S151 is outputted from the Q-terminal to one of input terminals the AND-gate 151. The other input terminal is fed with the signal S29. As an output, a signal S30 is issued from the AND-gate 151. The signal S70, the 16 MHz clock signal, and the signals 146a, 146b, and 29, are inputted to the duty step circuit 142. The signal S29 is inverted at the inverter 153 and is outputted as a signal S31.

Figure 13:
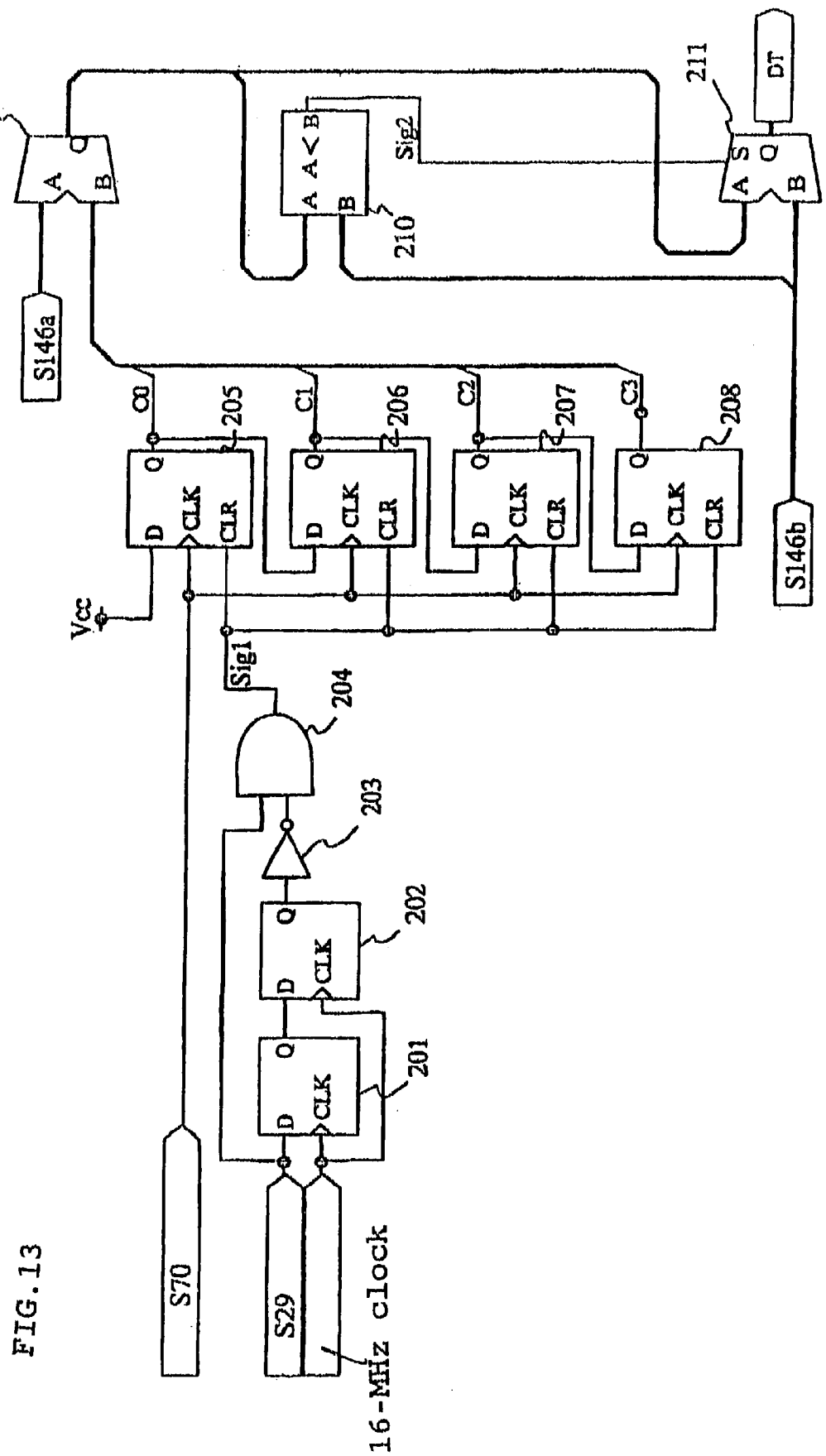
FIG. 13 illustrates a block diagram of a duty step circuit 152 which is shown in FIG. 12 as an element of the duty chopping drive circuit 38.
Figure 14:
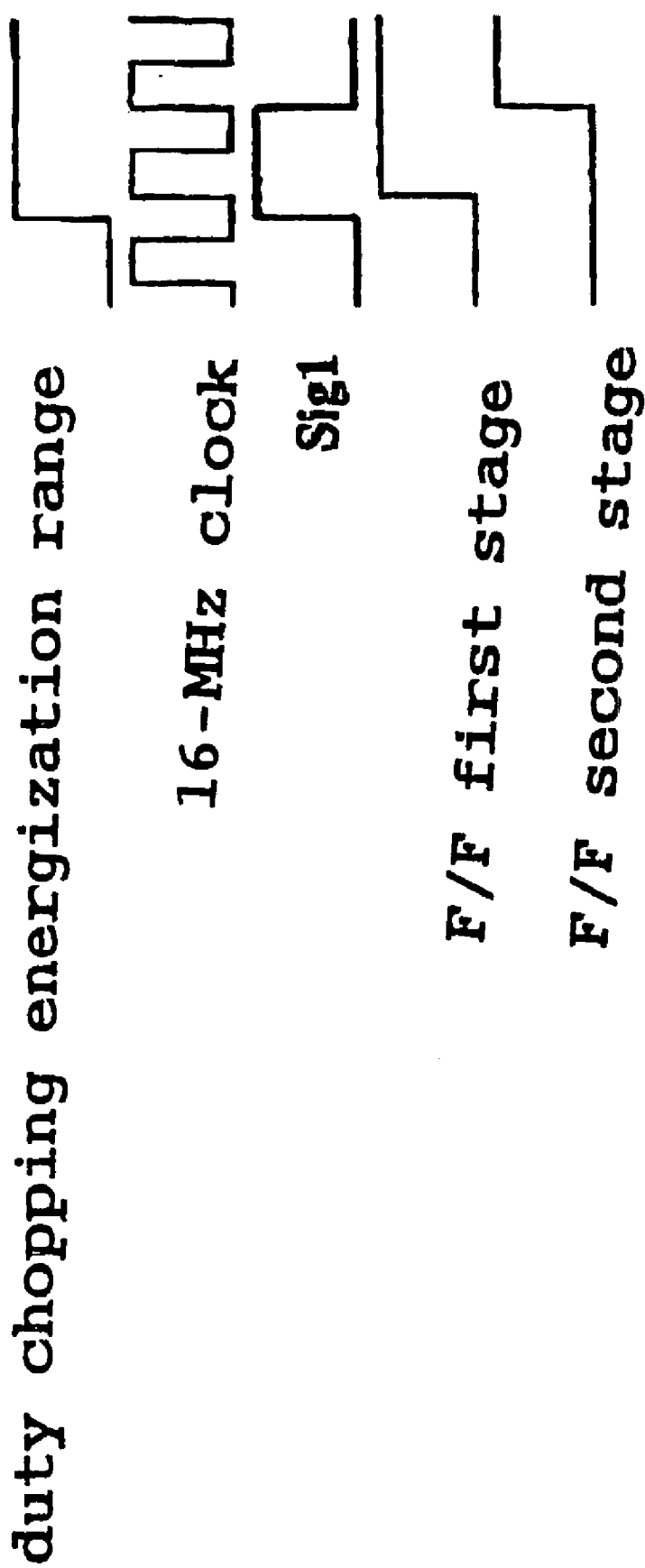
FIG. 14 illustrates signals which are related a signal Sig1.

Referring now to FIG. 13, there is illustrated a block diagram of the duty step circuit 152 when the count is a 4-bit type. The signal S29 is fed to a D-terminal of a flip-flop 201 and one of input terminals of an AND-gate 204. A 16 MHz clock signal is fed to a CLK-terminal of the flip-flop 201 and a CLK-terminal of a flip-flop 202. A Q-terminal of the flip-flop 202 is connected to a D-terminal of the flip-flop 202. A Q-terminal of the flip-flop 202 is connected to the other input terminal of the flip flop 202 by way of an inverter 203. An output signal Sig1 at the Q-terminal of the AND-gate 204 is fed or inputted to CLR-terminals of a first flip-flop 205, a second flipflop 206, a third flip-flop 207, and a fourth flip-flop 208, respectively, which constitute the counter. FIG. 14 shows how the signal S29, the 16 MHz clock signal, the output signal Sig1, the output signal of the flip-flop 201, and the output signal of the flip-flop 202 with passing of time.

A chopping clock signal S70 is also fed or inputted to CLK-terminals of the first flip-flop 205, the second flip-flop 206, the third flip-flop 207, and the fourth flip-flop 208, respectively. A voltage Vcc is applied to a D-terminal of the first flip-flop 205. An output signal C0 which is outputted from the Q-terminal of the first flip-flop 205 is inputted to a B-terminal of a subtracter 209 and a D-terminal of the second flip-flop 206. An output signal C1 from the Q-terminal of the second flip-flop 206 is inputted to the B-terminal of the subtracter 209 and the D-terminal of the third flip-flop 207. An output signal C2 from the Q-terminal of the third flip-flop 207 is inputted to the B-terminal of the subtracter 209 and the D-terminal of the fourth flip-flop 208. An output signal C3 from the Q-terminal is inputted to the B-terminal of the subtracter 209. In such a way, the B-terminal of the subtracter 209 is inputted with the 4-bit signals C0, C1, C2, and C3, the A-terminal of the subtracter 209 is of the subtracter 209 is inputted with a 4-bit initial-on time signal S146a. A 4-bit output signal of the subtracter 209 is inputted to an A-terminal of a comparator 210 and an A-terminal of a selector 211. A 4-bit ultimate-on time signal S146b is inputted to a B-terminal of the comparator 210 and a B-terminal of the selector 211. An output signal Sig2 of the comparator 210 is fed to an S-terminal of the comparator 211. The output signal Sig2 is a 1-bit signal which is indicative of e1 f (e0 f) if the signal inputted to the A-terminal of the comparator 211 is smaller than (equal to or less than) the signal inputted to the B-terminal of the comparator 211.

Figure 15:
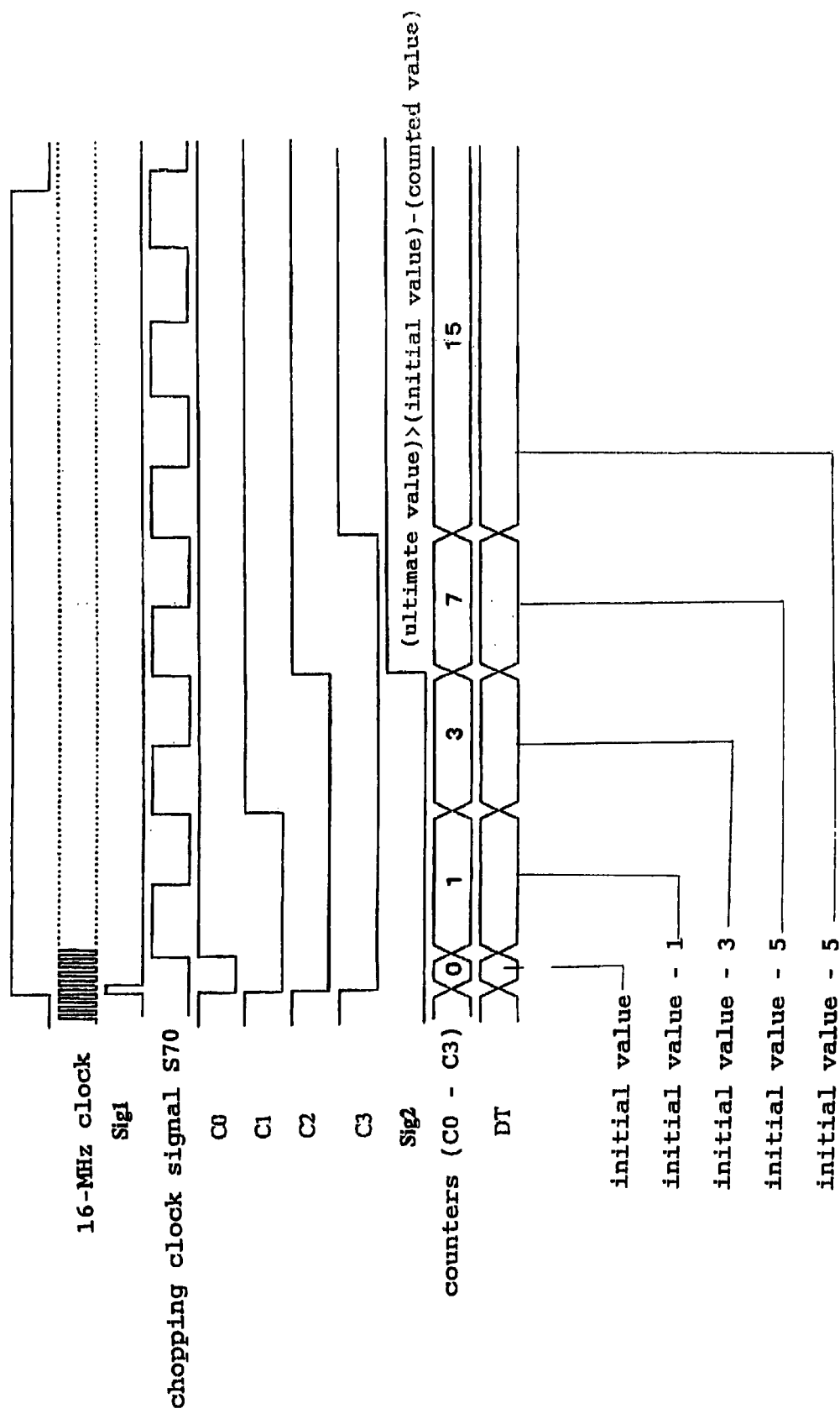
FIG. 15 illustrates how signals change in the circuit shown in FIG. 13 with passing of time.

When the rotational angle passes the second energization-on angle R31, the duty chopping energization range signal S29 changes from LOW level to HIGH level and in FIG. 13 the signal Sig1 becomes HIGH which is worth of 1 cycle HIGH level of the 16 MHz clock signal. Thus, at all the Q-terminals of the respective flip-flop 205, 206, 207, and 207, the output signals C0, C1, C2, and C3 become LOW level to clear the counter. Thereafter, when the chopping clock signal S70 becomes HIGH level from LOW level, the output signal C0 at the Q-terminal of the first flip-flop 205 becomes HIGH level. The change of the next signal S70 from LOW level to HIGH level and the resultant output signal C0 of the first flip-flop 205 make the output signal C1 at the Q-terminal of the second flip-flop 206 becomes HIGH level. Similarly, the output signal C2 of the third flip-flop 207 and the output signal C3 of the fourth flip-flop 208 are made HIGH level according to the change of the signal S70 from LOW level to HIGH level. Thus, the flip-flops 205, 206, 207, and 208 which are arranged in plural stages constitute a 2-1 counter. At the subtracter 209, the initial value (initial-on time duration) which is indicated in the signal 146a which is inputted to the A-terminal of the subtracter 209 is subtracted with each of the counted value C0, C1, C2, and C3 which are inputted to the B-terminal of the subtracter 209, the result is outputted from the Q-terminal of the subtracter 209 to the A-terminal of the comparator 210. At the comparator 210, the subtracted result inputted to its A-terminal is compared to the ultimate value (ultimate-on time duration) which is indicated by the signal S146b for detecting whether the former is smaller than the latter. So long as the subtracted result is larger than the ultimate value at the comparator 210, the output signal Sig2 outputted therefrom remains e0 f and the selector 211 outputs a signal S147 which is indicative of the previous subtracted result which is inputted to the A-terminal of the selector 211 from an output terminal DT of the duty step circuit 152. If the subtracted result becomes smaller than the ultimate value, the output signal Sig2 of the comparator 210 becomes e1 f and the selector 211 outputs the ultimate value (ultimate-on time duration) inputted to the B-terminal of the selector 211. FIG. 15 shows how the aforementioned signals change with passing of time.

Figure 16:
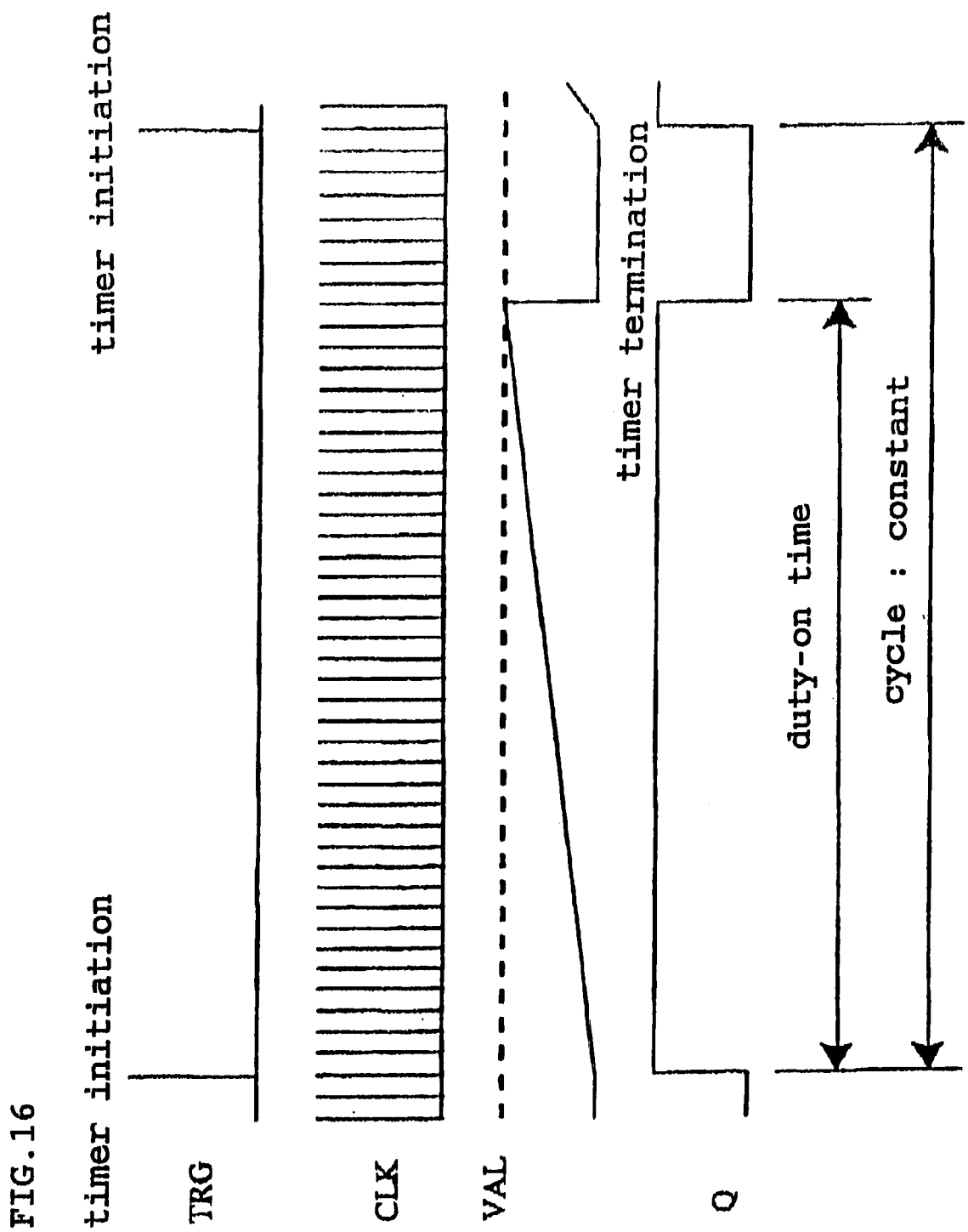
FIG. 16 illustrates how signals change in the circuit shown in FIG. 12 with passing of time.

As illustrated in FIG. 16, at the duty chopping drive circuit 138, a timer is initiated upon receipt of the chopping clock signal S70 as a trigger. Simultaneously, the output signal S70 outputted from the Q-terminal of the flip-flop 150 is made HIGH level from LOW level. The timer counting is made in synchronization with the 16 MHz clock signal fed to the CLK-terminal of the flip-flop 150. If the timer indication becomes the value which is indicated by the output signal S147 of the duty step circuit 152 which is inputted to the VAL-terminal of the flip-flop 150, the flip-flop 150 terminates the timer function, makes the output signal S151 LOW level from HIGH -level, and waits the next trigger. Thus, while the signal S29 is being made HIGH level, so long as the signal S151 is HIGH level and LOW level, the signal S30 is made HIGH level and LOW level, respectively. That is to say, for a fixed time duration which is determined by the signal S70, depending on the output signal DT of the duty step circuit 152, a time ratio of the HIGH level time duration of the signal S30 to the LOW level time duration of the signal S30 is determined.

Figure 17:
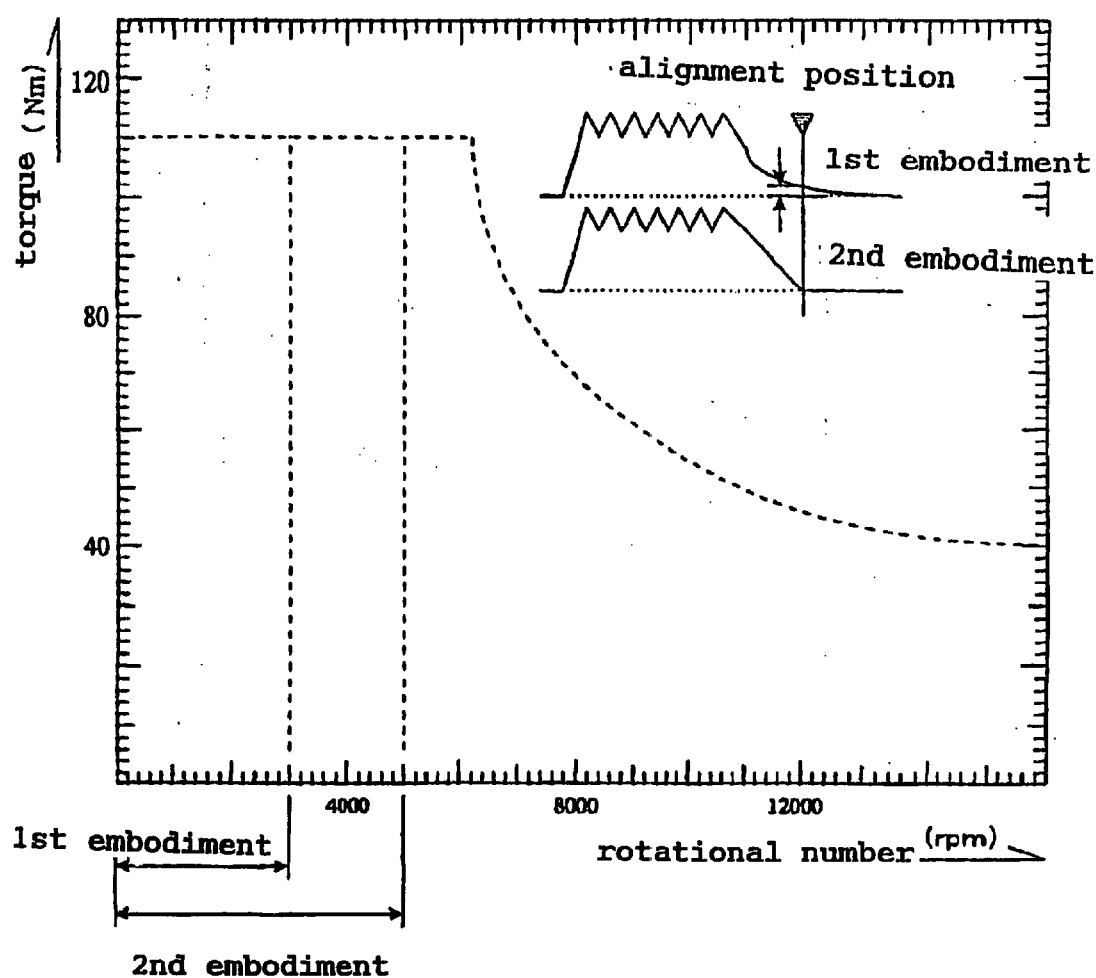
FIG. 17 illustrates, when the first embodiment or the second embodiment is employed, a graph which is indicative of the relation between torque and motor rotational number.
Figure 18:
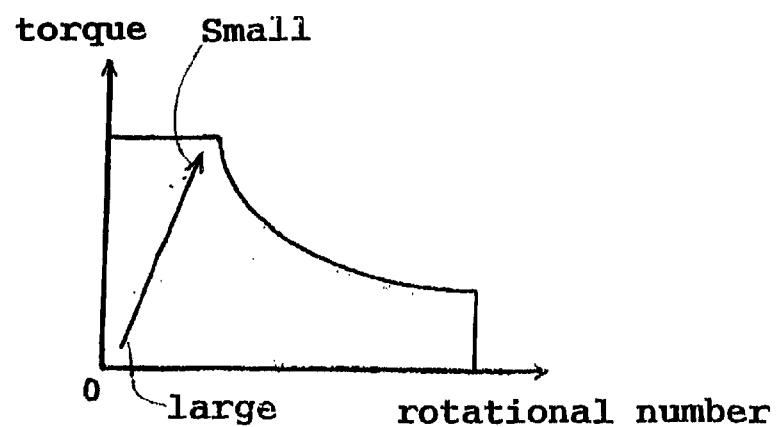
FIG. 18 illustrates, when the second embodiment is employed, a graph which is, with respect to duty-on time, indicative of the relation between torque and motor rotational number.

With reference to FIG. 17, when a comparison is made between the foregoing or first embodiment wherein the duty ratio is made a fixed value and the present or second embodiment wherein the duty ratio is made variable, the latter is available for wider rotation range of the SR motor 1. As the rotational speed of the SR motor 1 increases, at an alignment position at which the rotor R is in alignment with the stator S, the current flowing through each of the phase coils 1a, 1b, and 1c has to be made zero in the shortest possible time. The reason is that the current flowing is found even when the rotor R passes the alignment position, a torque occurs which reverses the SR motor 1 in opposite direction, thereby reducing the output torque thereof. The second embodiment, when compared to the first embodiment, makes it possible to reduce the current to zero in the shortest possible time, which causes the rotation range to expand or spread, thereby causing the noise reduction effect of the SR motor 1 over a wide range.

Figure 19:
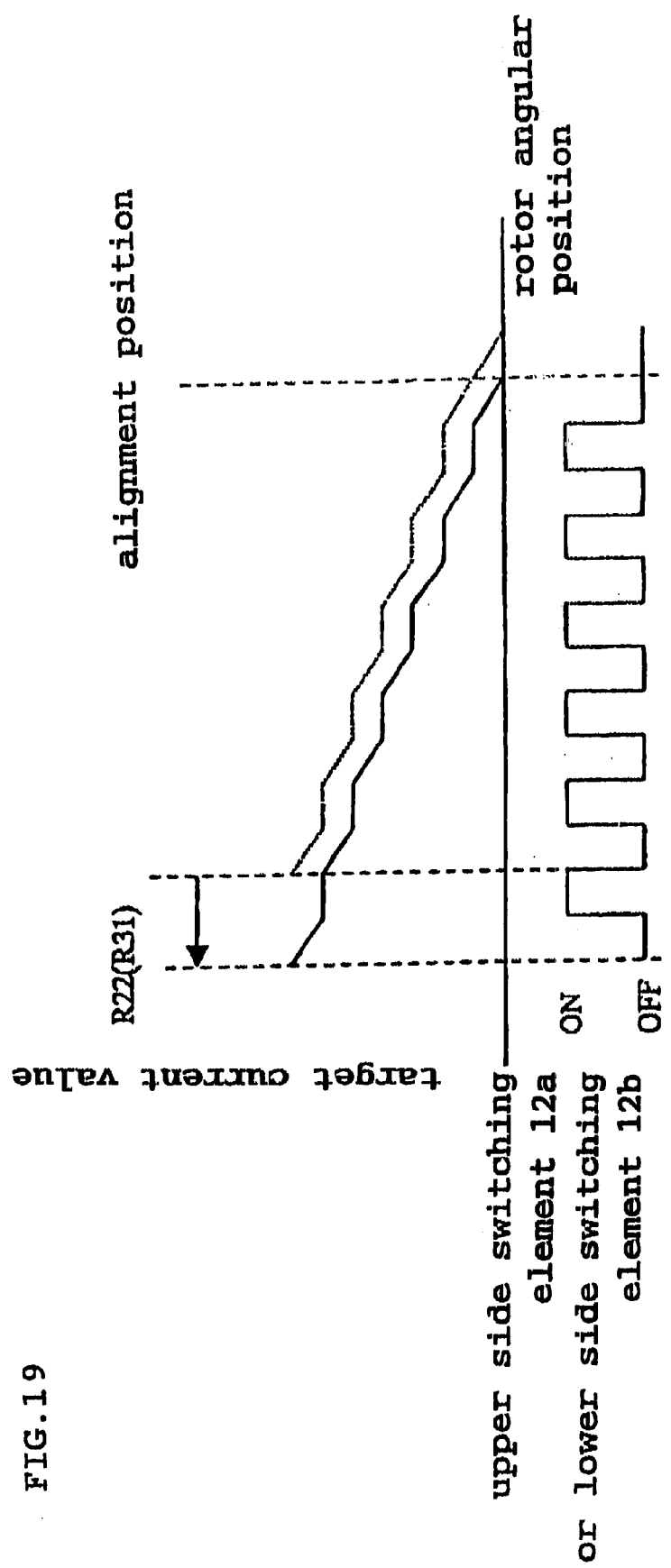
FIG. 19 illustrates how the rotor angular position R22 (R23) changes in the third embodiment.
Figure 20:
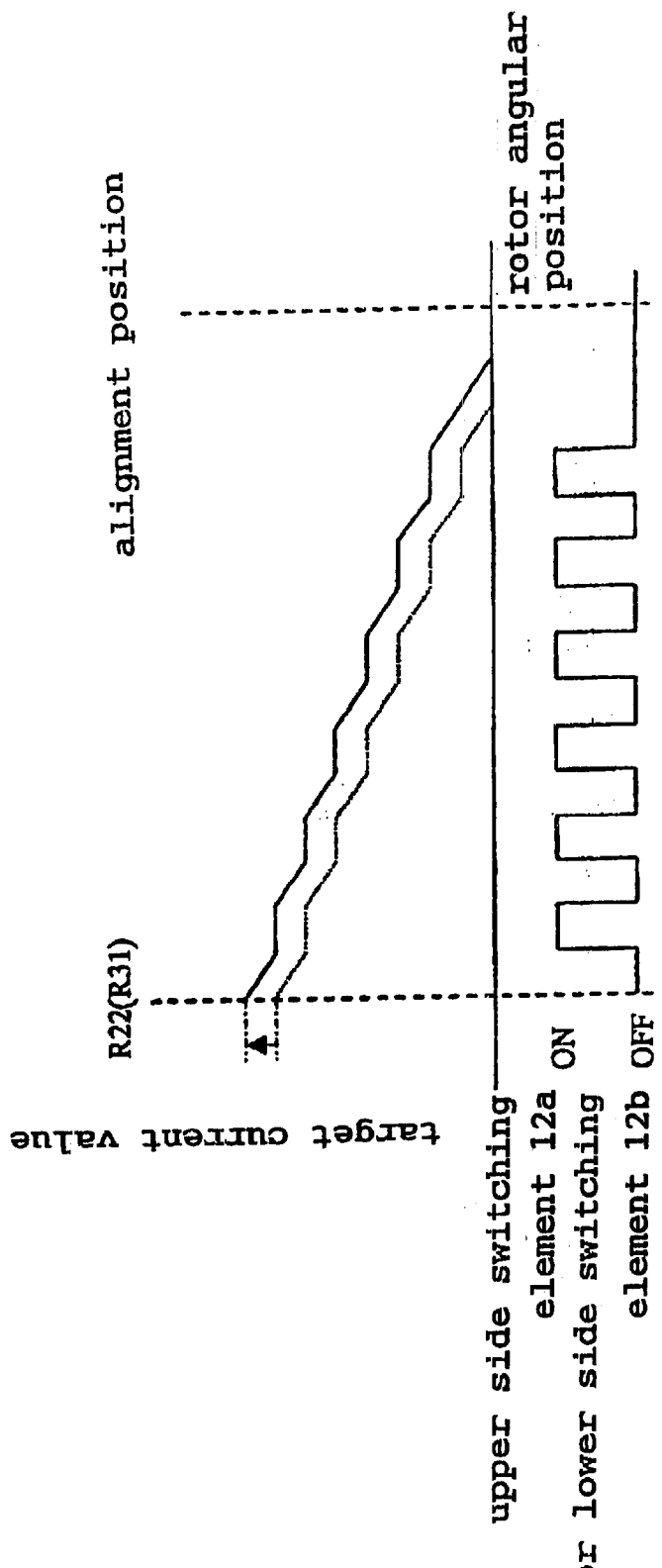
FIG. 20 illustrates how the target current value changes in the third embodiment.

In the third embodiment, the noise reduction effect of the SR motor 1 can be expected in a much wider range. That is, as shown in FIG. 19, a method is employed to put an amount of time ahead to appear the intermediate energization-off angle R22 (the second energization-on angle R31). At this time, the amount to be put ahead for earlier appearance of the intermediate energization-off angle R22 (the second energization-on angle R31) may sometimes cause at an earlier position than the alignment position, the current flowing through the phase coil reaches zero, whereby the SR motor 1 fails to attain the target output torque. Thus, in such a case, the target current to be passed through the phase coil is increased. However, it is desired to set a limit when establishing an earlier appearance of the intermediate energization-off angle R22 (the second energization-on angle R31). The degree the intermediate energization-off angle R22 (the second energization-on angle R31) should be put ahead and the degree the target current value should be increased are previously set depending on the target torque, the target current value, and the rotational number of the SR motor 1 and are stored in the controller 17. It is to be noted in the third embodiment, the duty ratio during chopping can be either fixed or variable. In addition, the first embodiment, the second embodiment, and the third embodiment can be employed when the SR motor 1 is at its low speed region, intermediate speed region, and high speed region, respectively.

According to the invention, even though the rotor reaches the first energization-off angle, with the second switching element 12b (i.e. the lower switching element) made OFF, the first switching element 12a (i.e. the upper switching element) is, at a duty rate, made ON and OFF alternately in repetition until the rotor reaches the second energization-off angle. Thus, the current flowing through each of the phase coils is decreased gradually, which makes it possible to considerably reduce the noise resulting from the rapid current decrease.

In accordance with the invention, even though the rotor reaches the intermediate energization-off angle, with the second switching element 12b (i.e. the lower switching element) made OFF, the first switching element 12a (i.e. the upper switching element) is, at a duty rate, made ON and OFF alternately in repetition until the rotor reaches the second energization-off angle. Thus, the current flowing through each of the phase coils is decreased gradually, which makes it possible to considerably reduce the noise resulting from the rapid current decrease.

In accordance with the present invention, the current flowing through each of the phase coils can be reduced to zero from the target current value within a much shorter time.

In accordance with the present invention, at a position at which the rotor is brought into in alignment with the stator, the current flowing through each of the phase coils can definitely be made zero, which makes it possible not to generate a reverse torque lowering the output torque.

The invention has thus been shown and described with reference to a specific embodiment, however, it should be understood that the invention is in no way limited to the details of the illustrated structures but changes and modifications may be made without departing from the scope of the appended claims.

What is claimed is:

1. An energization control device for electric motors comprising:
a plurality of phase coils arranged on a stator, one end of each of the phase coils being connected to one of high and low potential lines of a power supply by way of a first switching element,
the other end of each of the phase coils being connected to the other of the high and low potential lines of the power supply by way of a second switching element,
one end of the each of the phase coils being connected to the other of the high and low potential lines of the power supply by way of a first diode which allows current flow from the latter to the former,
the other end of each of the phase coils being connected to one of the high and low potential lines of the power supply by way of a second diode which allows current flow from the former to the latter; angular position detection means for detecting an angular position of the rotor;
rotational speed detection means for detecting a rotational speed of the rotor;
actual current detection means for detecting an actual current which passes through each of the phase coils; and
control means determining an energization-on angle, a first energization-off angle and a target current value, for each of the phase coils, on the basis of the rotational speed of the rotor and a target torque which is calculated based on an external information inputted,
the control means making one of the first and second switching elements ON-OFF and the other ON while the rotor rotates from the energization-on angle to the first energization-off angle, and approximating the actual current value to the target current value,
the control means determining a second energization-off angle on the basis of the target torque and the rotational speed of the rotor for each of the phase coils,
the control means making both the first and second switching elements OFF concurrently while the rotor rotates from the second energization-off angle to the energization-on angle,
the control means making one of the first and second switching elements ON-OFF at an arbitrary duty ratio and making the other OFF while the rotor moves from the first energization-off angle to the second energization-off angle.

2. An energization control device as set forth in claim 1, wherein the control means determines an intermediate energization-off angle between the first energization-off angle and the second energization-off angle, holds a condition under which one of the first and second switching elements is made ON and the other is made OFF concurrently while the rotor rotates from the first energization-off angle to the intermediate energization-off angle, and makes one of the first and second switching elements ON-OFF at an arbitrary duty ratio and makes the other OFF while the rotor moves from the intermediate energization-off angle to the second energization-off angle.

3. An energization control device as set forth in claim 2, wherein the control means makes one of the first and second switching elements ON-OFF at the duty ratio which is changed such that a ratio of an ON-time duration to an OFF-time duration is reduced with passing of time and makes the other OFF while the rotor moves from either of the first energization-off angle or the intermediate energization-off angle to the second energization-off angle.

4. An energization control device as set forth in claim 3, wherein either the first energization-off angle or the intermediate energization-off angle which are originally determined is put ahead.

5. An energization control device as set forth in claim 4, wherein between the first energization-off angle to the intermediate energization-off angle, the target current value is increased.

* * * * *